US012759667B2

(12) United States Patent
Blouin et al.

(10) Patent No.: US 12,759,667 B2
(45) Date of Patent: Oct. 13, 2026

(54) OFF-ROAD VEHICLE WITH FRONT CARGO STORAGE

(71) Applicant: TAIGA MOTORS INC., Lasalle (CA)

(72) Inventors: Charles Blouin, Saint-Germain-de-Grantham (CA); Moran Lecalonnec, Montreal (CA); Sergio Mora, Montreal (CA); Engueran Sobaco, Levis (CA)

(73) Assignee: TAIGA MOTORS INC., Lasalle (CA)

( * ) Notice: Subject to any disclaimer, the term of this patent is extended or adjusted under 35 U.S.C. 154(b) by 618 days.

(21) Appl. No.: 18/201,409

(22) Filed: May 24, 2023

(65) Prior Publication Data

US 2023/0382492 A1 Nov. 30, 2023

Related U.S. Application Data

(60) Provisional application No. 63/345,665, filed on May 25, 2022.

(51) Int. Cl.
*B62M 27/02* (2006.01)

(52) U.S. Cl.
CPC ....... *B62M 27/02* (2013.01); *B62M 2027/028* (2013.01)

(58) Field of Classification Search
CPC ........................ B62M 27/02; B62M 2027/028
See application file for complete search history.

(56) References Cited

U.S. PATENT DOCUMENTS 6,668,742 B2 * 12/2003 Nadeau ................. B63B 25/002 114/55.53
7,128,341 B1 * 10/2006 Dahl ......................... B60R 9/06 180/908
7,344,151 B2 * 3/2008 Sonoda .................. B62M 27/02 280/730.1
7,377,223 B2 * 5/2008 Toupin .................... B63B 34/10 114/55.53

(Continued)

FOREIGN PATENT DOCUMENTS

WO 2023129979 A1 7/2023

OTHER PUBLICATIONS

Splakeman, 94 tundra 2 engine swap | Ski-Doo Snowmobiles Forum, Feb. 16, 2017, https://www.dootalk.com/threads/94-tundra-2-engine-swap.1401650/, accessed on May 24, 2023.

(Continued)

*Primary Examiner* — Jacob B Meyer
(74) *Attorney, Agent, or Firm* — Norton Rose Fulbright Canada LLP

(57) ABSTRACT

Off-road vehicles including storage compartments are provided. An off-road vehicle includes a body extending along a longitudinal axis between a front end and a rear end, and at least one storage compartment at the front end of the body. The body includes at least one hood panel and at least one side panel. The at least one hood panel and the at least one side panel are disposed at the front end and at least partially delimit an inner cavity of the body. The at least one storage compartment occupies at least part of the inner cavity. The at least one storage compartment accessible via an opening in one or both of the at least one hood panel and the at least one side panel.

19 Claims, 16 Drawing Sheets

(56) References Cited

U.S. PATENT DOCUMENTS

| | | | | |
|---|---|---|---|---|
| 7,464,781 | B2 * | 12/2008 | Guay | B62K 5/05 180/215 |
| 9,694,872 | B2 * | 7/2017 | Laroche | B62K 5/05 |
| 10,336,409 | B1 * | 7/2019 | Girard | B63B 34/10 |
| 11,427,283 | B2 * | 8/2022 | Edwards | B62M 27/00 |
| 2021/0188182 | A1 * | 6/2021 | Edwards | B62D 57/024 |
| 2023/0182864 | A1 * | 6/2023 | Roy-Bernier | B60L 50/66 114/55.57 |
| 2023/0382492 | A1 * | 11/2023 | Blouin | B62M 27/02 |

OTHER PUBLICATIONS

Bilbobagginz, 95' ski-doo 583 hard start/quit/no start! | Snowmobile Forum, Jan. 22, 2012, https://www.snowmobileforum.com/threads/95-ski-doo-583-hard-start-quit-no-start.66459/, accessed on May 24, 2023.

* cited by examiner

OFF-ROAD VEHICLE WITH FRONT CARGO STORAGE

CROSS-REFERENCE TO RELATED APPLICATION(S)

This application claims priority from U.S. Provisional Patent Application No. 63/345,665, filed May 25, 2022, which is incorporated by reference in its entirety herein.

TECHNICAL FIELD

The application relates generally to off-road vehicles and, more particularly, to cargo storage onboard off-road vehicles.

BACKGROUND

Off-road vehicles are often designed to be compact in size. The limited interior space within an off-road vehicle may be primarily occupied by drivetrain components, leaving little interior space for cargo storage. For example, in snowmobiles which rely on internal combustion engines to generate motive force, internal volumes of the snowmobile are occupied by components associated with the internal combustion engine or which facilitate its operation, such as exhaust ducts, a muffler, a transmission, and the engine itself. There is consequently very little space, if any, for storing cargo.

SUMMARY

In one aspect, the disclosure describes a snowmobile comprising:

a body extending along a longitudinal axis between a front end and a rear end, the body including at least one hood panel and at least one side panel, the at least one hood panel and the at least one side panel disposed at the front end and at least partially delimiting an inner cavity of the body; and at least one storage compartment at the front end of the body and occupying at least part of the inner cavity, the at least one storage compartment accessible via an opening in one or both of the at least one hood panel and the at least one side panel.

The at least one storage compartment may comprise:

a wall extending into the inner cavity from the one or both of the at least one hood panel and the at least one side panel, the wall at least partially delimiting the opening; and a door moveably mounted to the body and displaceable relative to the body to cover and reveal the opening.

The door may be removably mounted to the body.

The door may be pivotably mounted to the body.

The door may be pivotable from a closed position in a forward direction to an open position.

The at least one storage compartment may include a bottom wall connected to the wall, the bottom wall defining a bottom surface of the at least one storage compartment.

The wall may be integral with the one or both of the at least one hood panel and the at least one side panel.

The at least one storage compartment may comprise at least one divider.

The at least one divider may include at least one shelf.

The wall may be load bearing.

The wall may be configured to transfer loads exerted on the one or both of the at least one hood panel and the at least one side panel to internal structures of the snowmobile.

The at least one storage compartment may be accessible via the at least one hood panel. The wall may be upright and may extend into the inner cavity from the at least one hood panel. The opening may be in the at least one hood panel. The door may be moveably mounted to the at least one hood panel and displaceable relative to the at least one hood panel to cover and reveal the opening.

The at least one storage compartment may be accessible via the at least one side panel. The wall may be substantially horizontal and may extend into the inner cavity from the at least one side panel. The opening may be in the at least one side panel. The door may be moveably mounted to the at least one side panel and displaceable relative to the at least one side panel to cover and reveal the opening.

The at least one storage compartment may include a hood panel storage compartment and a side panel storage compartment. The hood panel storage compartment may be accessible via the at least one hood panel. The hood panel storage compartment the wall may be upright and may extend into the inner cavity from the at least one hood panel. The opening may be in the at least one hood panel. The door may be moveably mounted to the at least one hood panel and displaceable relative to the at least one hood panel to cover and reveal the opening. The side panel storage compartment may be accessible via the at least one side panel, wherein for the side panel storage compartment the wall may be substantially horizontal and may extend into the inner cavity from the at least one side panel. The opening may be in the at least one side panel. The door may be moveably mounted to the at least one side panel and displaceable relative to the at least one side panel to cover and reveal the opening.

The hood panel storage compartment may be a first hood panel storage compartment. The hood panel storage compartment may include an at least second hood panel storage compartment spaced laterally apart from the first hood panel storage compartment along the at least one hood panel.

The at least one hood panel and the at least one side panel may be removably mounted to the body.

The snowmobile may comprise an electric motor.

The electric motor may be absent from the inner cavity.

The electric motor may be disposed within a mid-bay of the snowmobile.

The body may include a rear tunnel and a front sub-frame disposed closer to the front end than the rear tunnel. The front sub-frame may at least partially delimit the inner cavity.

The at least one hood panel and the at least one side panel may be removably mounted to the front sub-frame.

The at least one hood panel may be symmetrical about the longitudinal axis of the body.

The at least one side panel may include two side panels. The body may define a center plane being upright and containing the longitudinal axis. Each side panel may be on opposite sides of the center plane.

Each side panel may be spaced equidistantly from the center plane.

The at least one storage compartment may include two side panel storage compartments. Each side panel storage compartment may be accessible via a respective side panel of the two side panels. The two side panel storage compartments may be disposed on opposite sides of the center plane.

The at least one side panel may have an orientation substantially transverse to an orientation of the at least one hood panel.

The snowmobile may comprise a storage container being removably insertable into the at least one storage compartment through the opening. The storage container may be removably mountable to the body.

The body may include a mid-body panel. The at least one storage compartment may include a mid-body storage compartment accessible via a mid-body panel opening in the mid-body panel.

The snowmobile may comprise a plurality of electrical batteries. The at least one storage compartment may include a charging port for charging the plurality of electrical batteries.

The snowmobile may comprise a seat. The at least one storage compartment may be at least partially forward of the seat along the longitudinal axis.

The snowmobile may comprise a handle. The at least one storage compartment may be at least partially forward of the handle along the longitudinal axis.

Embodiments may include combinations of the above features.

In another aspect, the disclosure describes a method of providing storage to an off-road vehicle. The method comprises:

removing a hood panel or a side panel at a front end of the off-road vehicle; and mounting a new hood panel or a new side panel to the front end of the off-road vehicle, the new hood panel or the new side panel including at least one storage compartment.

In another aspect, the disclosure describes an off-road vehicle comprising:

a body extending along a longitudinal axis between a front end and a rear end, the body including a plurality of body panels, the plurality of body panels including a hood panel and a side panel disposed at the front end and at least partially delimiting an inner cavity of the body;

a plurality of storage compartments at the front end of the body occupying at least part of the inner cavity, the plurality of storage compartments accessible via one or both of the hood panel and the side panel; and a plurality of hatches, each hatch of the plurality of hatches moveably mounted to the body and displaceable relative to the body to cover and reveal a respective storage compartment of the plurality of storage compartments.

In some embodiments, at least one storage compartment of the plurality of storage compartments comprises:

a wall extending into the inner cavity from the one or both of the hood panel and the side panel, the wall at least partially delimiting an opening in the one or both of the hood panel and the side panel; and at least one hatch of the plurality of hatches displaceable relative to the body to cover and reveal the opening.

The at least one hatch may be removably mounted to the body.

The at least one hatch may be pivotably mounted to the body.

The at least one hatch may be pivotable from a closed position in a forward direction to an open position.

The at least one storage compartment may include a bottom wall connected to the wall. The bottom wall may define a bottom surface of the at least one storage compartment.

The wall may be integral with the one or both of the hood panel and the side panel.

The at least one storage compartment may comprise at least one divider.

The at least one divider may include at least one shelf.

The wall may be load bearing.

The wall may be configured to transfer loads exerted on the one or both of the hood panel and the side panel to internal structures of the off-road vehicle.

The at least one storage compartment may be accessible via the hood panel. The wall may be upright and extend into the inner cavity from the hood panel. The opening may be in the hood panel. Each hatch may be moveably mounted to the hood panel and displaceable relative to the hood panel to cover and reveal the opening.

The at least one storage compartment may be accessible via the side panel. The wall may be substantially horizontal and extend into the inner cavity from the side panel. The opening may be in the side panel. Each hatch may be moveably mounted to the side panel and displaceable relative to the side panel to cover and reveal the opening.

The at least one storage compartment may include a hood panel storage compartment and a side panel storage compartment. The hood panel storage compartment may be accessible via the hood panel, wherein for the hood panel storage compartment the wall may be upright and extend into the inner cavity from the hood panel. The opening may be in the hood panel, and each hatch may be moveably mounted to the hood panel and displaceable relative to the hood panel to cover and reveal the opening. The side panel storage compartment may be accessible via the side panel, wherein for the side panel storage compartment the wall may be substantially horizontal and extend into the inner cavity from the side panel. The opening may be in the side panel. Each hatch may be moveably mounted to the side panel and displaceable relative to the side panel to cover and reveal the opening.

The hood panel storage compartment may be a first hood panel storage compartment. The hood panel storage compartment may include an at least second hood panel storage compartment spaced laterally apart from the first hood panel storage compartment along the hood panel.

The hood panel and the side panel may be removably mounted to the body.

The off-road vehicle may comprise an electric motor.

The electric motor may be absent from the inner cavity.

The electric motor may be disposed within a mid-bay of the snowmobile.

The body may include a rear tunnel and a front sub-frame disposed closer to the front end than the rear tunnel. The front sub-frame may at least partially delimit the inner cavity.

The hood panel and the side panel may be removably mounted to the front sub-frame.

The hood panel may be symmetrical about the longitudinal axis of the body.

The plurality of body panels may include two side panels. The body may define a center plane being upright and containing the longitudinal axis. Each side panel may be on opposite sides of the center plane.

Each side panel may be spaced equidistantly from the center plane.

The plurality of storage compartments may include two side panel storage compartments. Each side panel storage compartment may be accessible via a respective side panel of the two side panels. The two side panel storage compartments may be disposed on opposite sides of the center plane.

The side panel may have an orientation substantially transverse to an orientation of the hood panel.

The off-road vehicle may comprise a storage container being removably insertable into a storage compartment of the plurality of storage compartments through the opening. The storage container may be removably mountable to the body.

The body may include a mid-body panel. The at least one storage compartment may include a mid-body storage compartment accessible via a mid-body panel opening in the mid-body panel.

The off-road vehicle may comprise a plurality of electrical batteries. At least one storage compartment of the plurality of storage compartments may include a charging port for charging the plurality of electrical batteries.

The off-road vehicle may comprise a seat. The plurality of storage compartments may be at least partially forward of the seat along the longitudinal axis.

The off-road vehicle may comprise a handle. The plurality of storage compartments may be at least partially forward of the handle along the longitudinal axis.

In another aspect, the disclosure describes a snowmobile comprising:

a body extending along a longitudinal axis between a front end and a rear end, the body including at least one hood panel at the front end of the body; and at least one storage compartment defining an opening selectively closable by the at least one hood panel.

The at least one storage compartment may further define a storage volume to store items, where the opening allows access to the storage volume.

The at least one hood panel may include a door moveably mounted to the body and displaceable relative to the body to cover and reveal the opening. The door may be removably mounted to the body and/or be pivotably mounted to the body. The door may be pivotable from a closed position in a forward direction to an open position.

The at least one hood panel may be moveably mounted to the body and displaceable relative to a or the remainder of the body to cover and reveal the opening. The at least one hood panel may be removably mounted to the body and/or be pivotably mounted to the body. The at least one hood panel may be pivotable from a closed position in a forward direction to an open position.

In some embodiments, the at least one hood panel at least partially delimits an inner cavity of the body and the at least one storage compartment comprises a wall (optionally a side wall) extending into the inner cavity from the at least one hood panel and/or from the opening, the wall at least partially delimiting the opening.

The at least one storage compartment may include a bottom wall connected to the wall, the bottom wall defining a bottom surface of the at least one storage compartment.

The wall may be upright and extend into the inner cavity from the at least one hood panel.

The wall may be load bearing. For example, the wall may be configured to transfer loads exerted on the at least one hood panel to internal structures of the snowmobile.

The snowmobile may comprise an electric motor for propelling the snowmobile. The electric motor may absent from the inner cavity. The electric motor may be disposed within a mid-bay of the snowmobile.

The body may include a rear tunnel and a front sub-frame disposed closer to the front end than the rear tunnel, the front sub-frame at least partially delimiting the inner cavity.

The at least one hood panel may be removably mounted to the front sub-frame.

The at least one storage compartment may be removeable from, and/or releasably installed in, the inner cavity.

The storage compartment may be integral with the at least one hood panel or the storage compartment may be separate from the at least one hood panel.

The at least one storage compartment may comprise at least one divider. Optionally, the at least one divider includes at least one shelf.

The snowmobile may comprise a handle for steering the snowmobile, and the at least one storage compartment may be forward of the handle along the longitudinal axis. The opening may be forward of the handle and/or the at least one hood panel may be forward of the handle.

In another aspect, the disclosure describes a snowmobile comprising:

a body extending along a longitudinal axis between a front end and a rear end, the body including at least one side panel at the front end of the body; and at least one storage compartment defining an opening selectively closable by the at least one side panel.

The at least one storage compartment may further define a storage volume to store items, where the opening allows access to the storage volume.

The at least one side panel may include a door moveably mounted to the body and displaceable relative to the body to cover and reveal the opening. The door may be removably mounted to the body and/or be pivotably mounted to the body. The door may be pivotable from a closed position in a forward direction to an open position.

The at least one side panel may be moveably mounted to the body and displaceable relative to a or the remainder of the body to cover and reveal the opening. The at least one side panel may be removably mounted to the body and/or be pivotably mounted to the body. The at least one side panel may be pivotable from a closed position in a forward direction to an open position.

In some embodiments, the at least one side panel at least partially delimits an inner cavity of the body and the at least one storage compartment comprises a wall (which may be a side wall) extending into the inner cavity from the at least one side panel and/or the opening, the wall at least partially delimiting the opening.

The at least one storage compartment may include a bottom wall connected to the wall, the bottom wall defining a bottom surface of the at least one storage compartment.

The wall may be upright and extend into the inner cavity from the at least one side panel.

The wall may be load bearing. For example, the wall may be configured to transfer loads exerted on the at least one side panel to internal structures of the snowmobile.

The snowmobile may comprise an electric motor for propelling the snowmobile. The electric motor may absent from the inner cavity. The electric motor may be disposed within a mid-bay of the snowmobile.

The body may include a rear tunnel and a front sub-frame disposed closer to the front end than the rear tunnel, the front sub-frame at least partially delimiting the inner cavity.

The at least one side panel may be removably mounted to the front sub-frame.

The at least one storage compartment may be removeable from, and/or releasably installed in, the inner cavity.

The storage compartment may be integral with the at least one side panel or the storage compartment may be separate from the at least one side panel.

The at least one storage compartment may comprise at least one divider. Optionally, the at least one divider includes at least one shelf.

The snowmobile may comprise a handle for steering the snowmobile, and the at least one storage compartment may be forward of the handle along the longitudinal axis. The opening may be forward of the handle and/or the at least one side panel may be forward of the handle.

Embodiments may include combinations of the above features.

DESCRIPTION OF THE DRAWINGS

Reference is now made to the accompanying figures in which.

DETAILED DESCRIPTION

The following disclosure relates to off-road vehicles and associated methods for providing storage on off-road vehicles. Some off-road vehicles described herein include a straddle seat and may be referred to as "straddle seat vehicles". The off-road vehicles may include electric motors for effecting propulsion of the vehicles in both a forward and reverse direction. In some embodiments, the off-road vehicles and methods described herein may be applicable to electric powersport vehicles that may be operated off-road and/or in relatively rugged environments. Examples of suitable off-road vehicles, such as electric and non-electric powersport vehicles, include snowmobiles, personal watercraft, all-terrain vehicles (ATVs), and utility task vehicles (UTVs). As used herein, the term off-road vehicle refers to vehicles to which at least some regulations, requirements or laws applicable to on-road vehicles do not apply.

The terms "connected", "connects" and "coupled to" may include both direct connection and coupling (in which two elements contact each other) and indirect connection and coupling (in which at least one additional element is located between the two elements).

Figure 1:
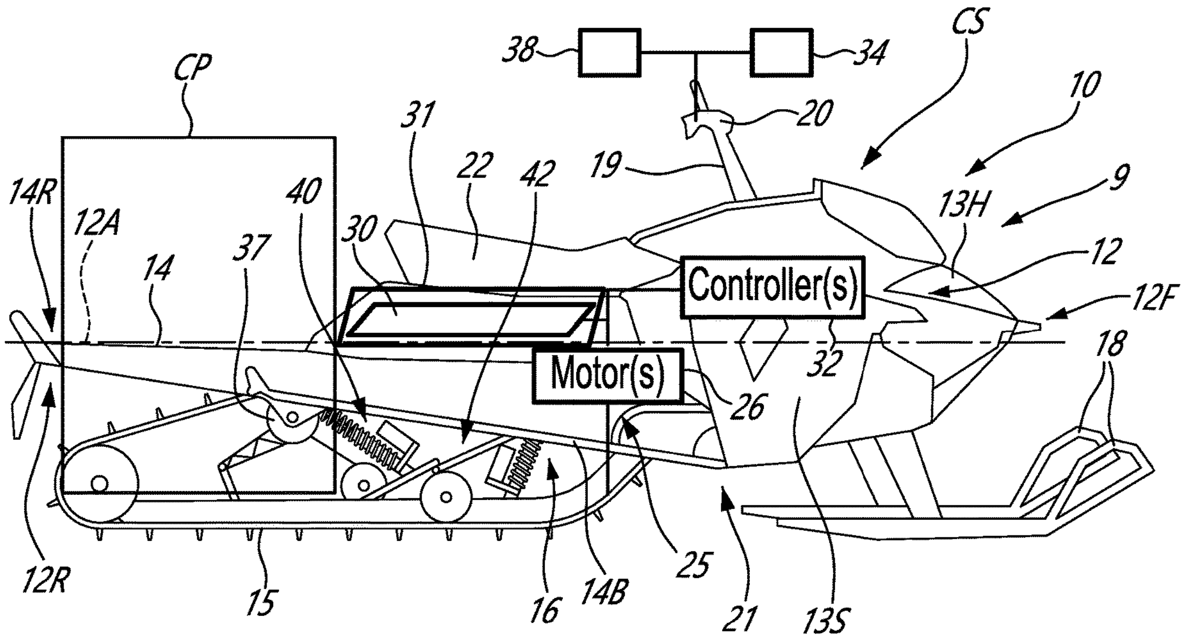
FIG. 1 is a schematic representation of a snowmobile.

With reference to FIG. 1, an example of an off-road vehicle 9 is shown. The off-road vehicle 9 of FIG. 1 is illustrated as a snowmobile 10. The off-road vehicle 9 may include another type of vehicle. In some embodiments, the snowmobile 10 includes elements of the snow vehicle described in International Patent Application no. PCT/IB2018/056940 entitled "Battery arrangement for electric snow vehicles", and U.S. patent application Ser. No. 17/569,803 entitled "Electric vehicle with battery pack as a structural element", the entirety of each of which is incorporated by reference in the present disclosure.

The snowmobile 10 may include a body 12 (also known as a frame or a chassis) which may include a tunnel 14, a drive track 15 having the form of an endless belt for engaging the ground (e.g., snow) and disposed under the tunnel 14, and a powertrain 16 mounted to the body 12 and configured to displace the drive track 15. Left and right skis 18 are disposed in a front portion of the snowmobile 10, and a straddle seat 22 is disposed above the tunnel 14 for accommodating an operator of the snowmobile 10 and optionally one or more passengers. The left and right skis 18 may be movably attached to the body 12 to permit steering of the snowmobile 10 via a steering assembly including a steering column 19 connected to a handle 20 or handlebars.

Figure 1A:
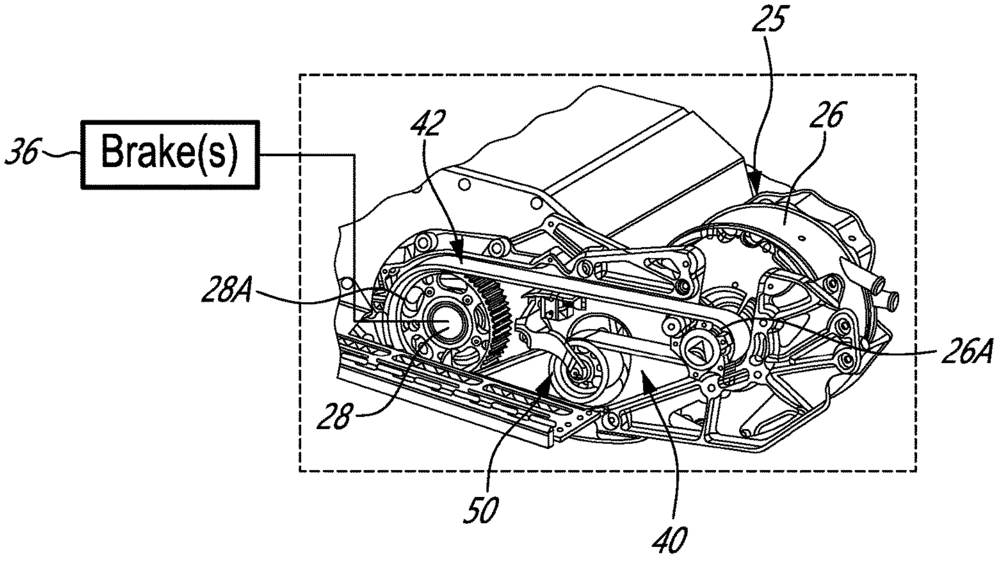
FIG. 1A is an enlarged view of part of a powertrain of the snowmobile of FIG. 1.

Referring to FIGS. 1 and 1A, the powertrain 16 of the snowmobile 10 includes an electric motor assembly 25. The electric motor assembly 25 is a collection of components and features which function to deliver an electric drive to displace the snowmobile 10. The electric motor assembly 25 includes one or more electric motor(s) 26 drivingly coupled to the drive track 15 via a drive shaft 28. The electric motor 26 may be or include a permanent magnet synchronous motor. In one embodiment, the electric motor 26 has a maximum output power of between 120 and 180 horse power. In other embodiments, the electric motor 26 has a maximum output power of at least 180 horse power. The drive shaft 28 may be drivingly coupled to the drive track 15 via one or more toothed wheels or other means so as to transfer motive power from the electric motor 26 to the drive track 15. The powertrain 16 may also include one or more batteries 30 or battery modules for providing electric energy (i.e. electric current) to the electric motor 26 and driving the electric motor 26. The operation of the electric motor 26 and the delivery of drive current to the electric motor 26 from the battery 30 may be controlled by a controller 32 based on an actuation of an input device 34, sometimes referred to as an "accelerator" or "throttle", by the operator. The controller 32 and the input device 34 are part of a control system CS for controlling operation of the snowmobile 10. In some embodiments, the battery 30 may be a lithium ion or other type of battery 30. In the embodiment where the snowmobile 10 is driven by one or more electric motor(s) 26 powered by the batteries 30, the snowmobile 10 may be referred to as an "electric snowmobile 10". Other sources of propulsion and of fuel are possible for the snowmobile 10. For example, in an embodiment, the snowmobile 10 has an internal combustion engine which generates motive power by combusting a hydrocarbon fuel.

The one or more batteries 30 of the snowmobile 10 are housed in a battery pack 31. The battery pack 31 is a housing or other enclosure which defines an inner volume in which the batteries 30 are located and sealed-off from an environment external to the battery pack 31. The battery pack 31 is an elongated and at least partially-hollow component which extends in a direction parallel to a length of the body 12. Each of the batteries 30 enclosed within the battery pack 31 may sometimes be referred to in this disclosure as a "battery module 30" because, in an embodiment, each battery 30 is an assembly or collection of electrically-linked, electrochemical cells.

The snowmobile 10 may also include one or more brake (s) 36 (referred hereinafter in the singular) that may be applied or released by an actuation of a brake actuator (e.g., lever) 38 by the operator for example. The brake 36 may be operable as a main brake for the purpose of slowing and stopping the snowmobile 10 during motion of the snowmobile 10. The brake 36 may comprise a combination of tractive braking and regenerative braking. In some embodiments, the brake 36 may be operable as described in U.S. patent application Ser. No. 17/091,712 entitled "Braking system for an off-road vehicle", the entirety of which is incorporated herein by reference. Alternatively or in addition, the brake 36 may be operable as a parking brake, sometimes called "e-brake" or "emergency brake", of the snowmobile 10 intended to be used when the snowmobile 10 is stationary. In various embodiments, such main and parking brake functions may use separate brakes, or may use a common brake 36. In some embodiments of tractive braking, the brake actuator 38 may be lockable when the brake 36 is applied in order to use the brake 36 as a parking brake. The brake 36 may be electrically or hydraulically operated. For example, the brake 36 may include a master cylinder operatively coupled to a brake caliper that applies brake pads against a brake rotor that is coupled to the powertrain 16. In some embodiments, such brake rotor may be secured to and rotatable with the drive shaft 28. In some embodiments, the brake 36 is electrically connected to the battery 30. The brake 36 is a regenerative brake 36, or applies regenerative braking, such that the brake 36 or components thereof are able to supply the battery 30 with electric energy when the brake 36 is applied to a component of the powertrain 16, and/or when the operator releases the accelerator 34. Regenerative braking may also or instead be implemented by the electric motor 26.

Referring to FIG. 1A, the electric motor 26 is in torque-transmitting engagement with the drive shaft 28 via a transmission 40. The transmission 40 may be of a belt/pulley type, a chain/sprocket type, or a shaft/gear type for example. Referring to FIG. 1A, the transmission 40 is of a belt/pulley type. The transmission 40 includes a drive belt 42 that is mounted about a motor output 26A of the electric motor 26, and is also mounted about a drive track wheel 28A for driving the drive shaft 28. The drive belt 42 therefore extends between the motor output 26A and the drive track wheel 28A for conveying torque from the electric motor 26 to the drive shaft 28. The drive shaft 28 provides torque to the drive track 15. The drive belt 42 is thus displaced or driven by the motor output 26A in a linear manner between the motor output 26A and the drive track wheel 28A, and in a circumferential manner about the motor output 26A and the drive track wheel 28A.

The motor output 26A may have any suitable feature, such as teeth, lugs, etc., which facilitates engagement with the drive belt 42. The drive belt 42 may have any suitable configuration to achieve the functionality ascribed to it herein. For example, and referring to FIG. 1A, the drive belt 42 is an elastomer that has a ribbed or toothed inner side defining an inner surface of the drive belt 42 for engaging the motor output 26A and the drive track wheel 28A, and a smooth or flat outer side defining an outer surface of the drive belt 42. In one possible configuration, the drive belt 42 is a carbon-fiber reinforced elastomer. In another possible configuration, the drive belt 42 is a chain belt or chain which is engaged and driven by teeth of the motor output 26A and the drive track wheel 28A. The drive belt 42 is thus used to transmit power from the motor output 26A. The drive belt 42 provides tractive force to the snowmobile 10 and transfers mechanical energy from the electric motor 26 to the drive track wheel 28A. In an embodiment, the drive belt 42 is not a serpentine belt which functions to power motor auxiliaries or a supercharger.

In an embodiment of the powertrain 16, the electric motor 26 and the drive shaft 28 are horizontally spaced apart from each other. The drive shaft axis 28B and the motor output axis 26A1 are also horizontally spaced apart from each other and are parallel to each other. In FIG. 1A, the electric motor 26 and the drive shaft 28 are horizontally spaced apart from each other along the length of the snowmobile 10. The powertrain 16 may also have any other suitable orientation to displace the drive track 15. For example, in another embodiment of the powertrain 16, the electric motor 26 and the drive shaft 28 are vertically spaced apart from each other.

Referring to FIG. 1A, the electric motor 26 and its motor output 26A generate, produce, or output a torque. The drive belt 42 is driven by the torque, and transmits the torque to the drive track wheel 28A in order to rotate the drive shaft 28 about a drive shaft axis and displace the drive track 15. The torque generated by the electric motor 26 is thus experienced by the drive belt 42. The transmission 40 may optionally have a drive belt tensioner 50 to apply tension to part of the drive belt 42. In an embodiment, the transmission 40 is devoid of the drive belt tensioner 50.

Referring to FIG. 1, the body 12 and at least some of its components extend along a longitudinal axis 12A between a front end 12F of the body 12 and a rear end 12R of the body 12. Referring to FIG. 1, the longitudinal axis 12A is a center axis of the body 12. The body 12 defines a center plane CP (partially shown in FIG. 1) being an upright plane containing the longitudinal axis 12A. The center plane CP divides the body 12 into two equal lateral sides (e.g. left and right sides of the snowmobile 10). The front and rear ends 12F, 12R are defined with respect to the direction of travel of the snowmobile 10, in that the front end 12F is the end of the body 12 that faces toward the forward direction of travel of the snowmobile 10. Similarly, the rear end 12R is the end of the body 12 that faces toward the aft or reverse direction of travel of the snowmobile 10.

Referring to FIG. 1, the body 12 includes structural or load-bearing components to support the loads generated during operation of the snowmobile 10. One example of a structural component of the body 12 is the tunnel 14. The tunnel 14 is an elongated component extending in a direction parallel to the longitudinal axis 12A of the body 12. A rear end 14R of the tunnel 14 is disposed at, or defines, the rear end 12R of the body 12. The tunnel 14 extends from the rear end 14R in a forward direction to a front end. In the example of the tunnel 14 shown in FIG. 1, much of the tunnel 14 is positioned closer to the rear end 12R of the body 12 than the front end 12F such that the tunnel 14 forms the rearmost portions of the body 12. In such a configuration, the tunnel 14 may sometimes be referred to as a "rear" tunnel 14. The tunnel 14 overlies the drive track 15 and at least partially encloses the drive track 15 from above. The tunnel 14 is positioned vertically between the straddle seat 22 and the drive track 15. The tunnel 14 is aligned with the longitudinal axis 12A of the body 12. The tunnel 14 is symmetric about the center plane CP. The center plane CP is laterally centered relative to the tunnel 14. The tunnel 14 is a structural or load-bearing component which functions to support and/or distribute loads generated during operation of the snowmobile 10. The tunnel 14 may have any shape or configuration to achieve the functionality ascribed to the tunnel 14 herein. For example, and referring to FIG. 1, the tunnel 14 may be monolithic or integral so as to form a single-piece tunnel 14, or alternatively may be separate components joined together to form an assembled tunnel 14. In an embodiment, a cross-section of the tunnel 14 taken in a plane that is perpendicular to the longitudinal axis 12A has a shape substantially like an inverted U.

In an embodiment, the tunnel 14 includes vertically-oriented side walls disposed on opposite sides of the longitudinal axis 12A for further enclosing the drive track 15. In an embodiment, and referring to FIG. 1, the tunnel 14 includes a running board 14B or footrest on each of the left and right sides of the snowmobile 10 against which the operator may rest their feet. Each running board 14B may be a substantially horizontal and planar body having a length defined along the longitudinal axis 12A and extending from one of the side walls of the tunnel 14. In an alternate configuration, each running board 14B may be a substantially horizontal body extending from the side of another part of the body 12. The tunnel 14 may be made of any suitable material or materials. Some non-limiting examples of materials for the tunnel 14 include metal, polymer composites, and a combination of metal and polymer composites. The tunnel 14 may be supported in whole or in part by a rear suspension system of the snowmobile 10. In an embodiment, the tunnel 14 is immobile within the snowmobile 10 and experiences no movement relative to other components of the body 12.

Referring to FIGS. 1 and 1A, the electric motor assembly 25 may be disposed in a mid-bay 21 of the snowmobile 10, which is forward of the tunnel 14. A front wall of the tunnel 14 may form a rear wall of the mid-bay 21. The electric motor assembly 25 may also be disposed below the battery pack 31 in the mid-bay 21. In this way, the electric motor assembly 25 is provided in a compact configuration within the snowmobile 10 to increase available interior space within the snowmobile 10. In other embodiments, the electric motor assembly 25 may disposed in other positions within the snowmobile 10 to provide a compact configuration. For example, the electric motor assembly 25 may be disposed above the tunnel 14 or forward of the battery pack 31.

Figure 2A:
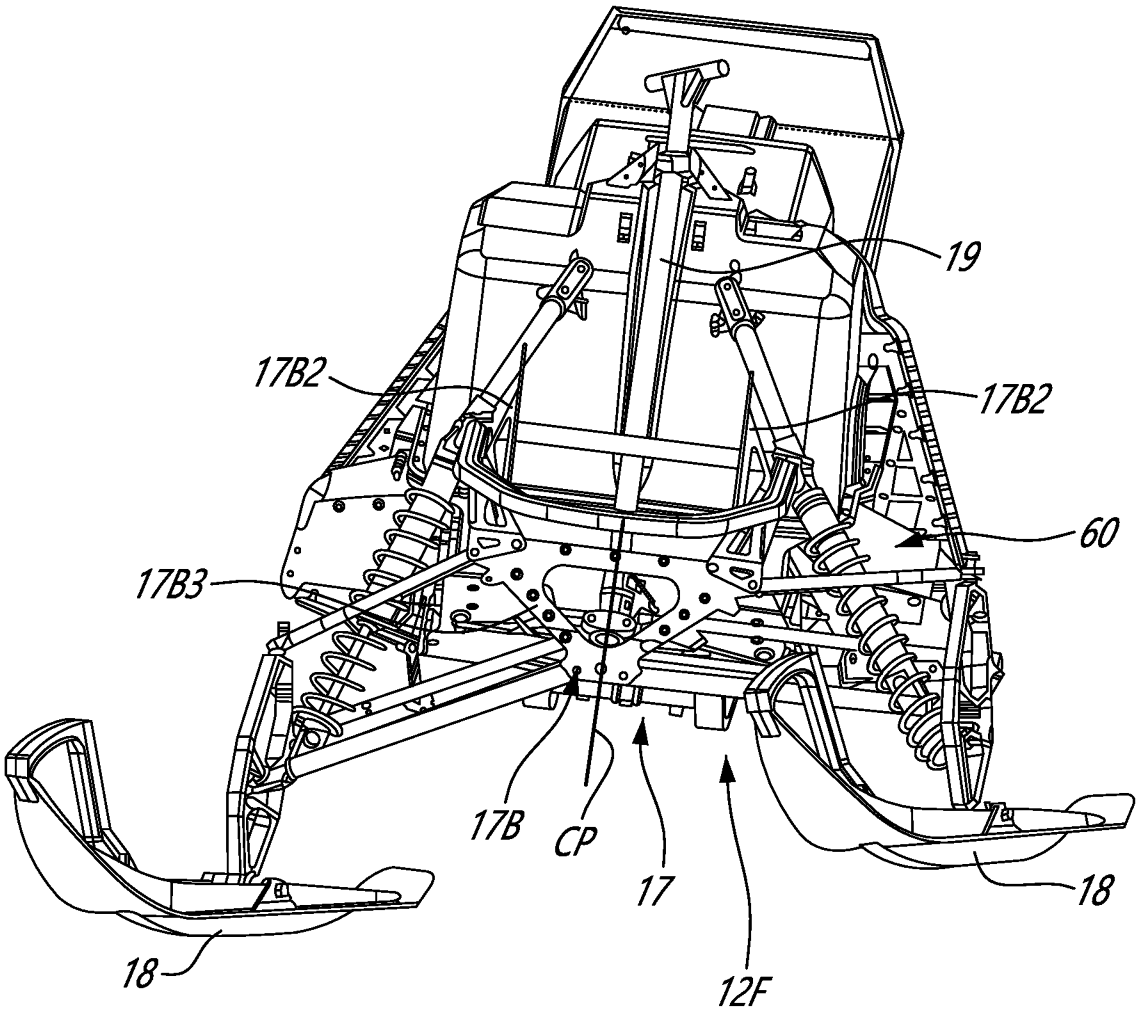
FIG. 2A is a front view of the snowmobile of FIG. 1, with several body panels removed.
Figure 2B:
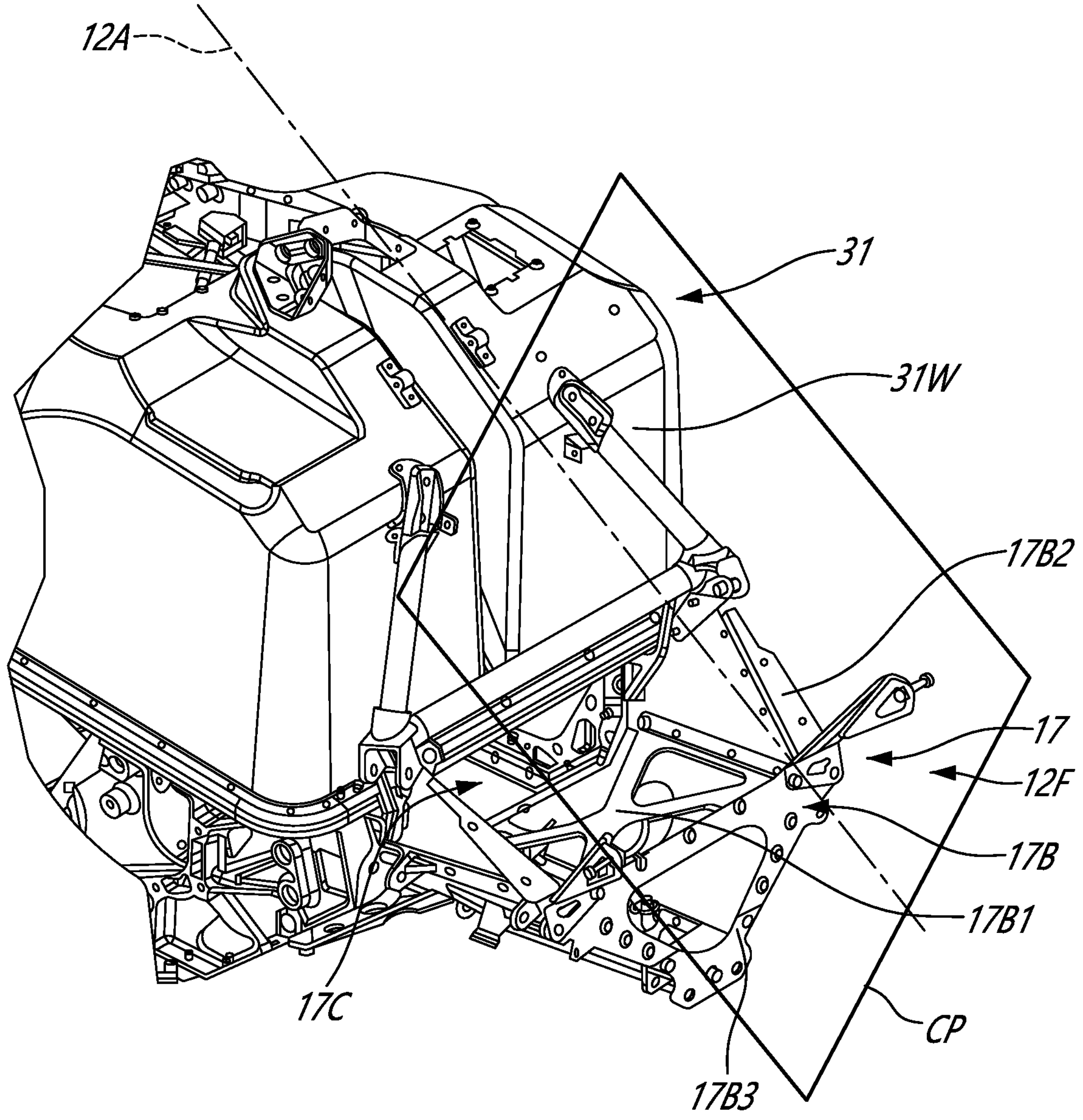
FIG. 2B is a front perspective view of part of the snowmobile of FIG. 1.

Referring to FIGS. 2A and 2B, the body 12 includes a front sub-frame 17, which may be referred to as a front brace structure. The front sub-frame 17 is another example of a structural component of the body 12. The front sub-frame 17 is disposed forward of the tunnel 14 and of the mid-bay 21. The front sub-frame 17 is also forward of the electric motor assembly 25 and the battery pack 31. The front sub-frame 17 is disposed at, or defines, the front end 12F of the body 12. The front sub-frame 17 is a structural or load-bearing component which functions to support and/or distribute loads generated during operation of the snowmobile 10. For example, the front sub-frame 17 is connected to, and supports, a front suspension 60 of the snowmobile 10. The front suspension 60 is located at the front end 12F of the body 12, is connected to the skis 18, and functions to absorb loads and shocks from the left and right skis 18 during operation of the snowmobile 10, thereby eliminating or reducing the effect of such loads and shocks on the body 12 and on the operator. The front sub-frame 17 is thus connected to the skis 18 via the front suspension 60. The front sub-frame 17 is an assembly of different components, at least some of which are described in greater detail below.

In the illustrated embodiment, the front sub-frame 17 is connected to the battery pack 31 at various surfaces of the battery pack 31. The front sub-frame 17 may transfer loads from the front suspension 60 to the battery pack 31. In this way, the battery pack 31 acts as a structural component of the snowmobile 10. Other embodiments are also contemplated. For example, the snowmobile may include an upper frame or over-structure disposed overtop of the battery 31. The front sub-frame 17 and the tunnel 14 may be connected to the over-structure to transfer loads between the front sub-frame 17 and the tunnel 14.

One possible and non-limiting configuration of the front sub-frame 17 is now described with reference to FIGS. 2A and 2B. The front sub-frame 17 includes a brace structure 17B that is fixedly mounted to, or part of, the body 12, and which supports the front suspension 60. The brace structure 17B defines or provides vertically-spaced attachment points (sometimes referred to herein as "pickups") to which components of the front suspension 60 may be pivotably mounted. The brace structure 17B includes a base member 17B1 or plate. The base member 17B1 has a substantially horizontal orientation. The brace structure 17B includes two upright members 17B2 extending upwardly from the base member 17B1. Each of the upright members 17B2 is spaced equidistantly from the center plane CP on opposite sides thereof. The brace structure 17B includes a front member 17B3 that is mounted to one or more of the base member 17B1 and upright member(s) 17B2. The front member 17B3 has a substantially upright orientation. The base, upright and front members 17B1, 17B2, 17B3 are positioned forwardly of the battery pack 31. The base, upright and front members 17B1, 17B2, 17B3 are positioned forwardly of an upright and forwardmost wall 31W of the battery pack 31.

Referring to FIGS. 2A and 2B, at least the base member 17B1 and upright member(s) 17B2 may at least partially define an inner cavity 17C of the front sub-frame 17. The inner cavity 17C is an internal volume of the snowmobile 10. In some embodiments, the electric motor assembly 25 and/or other components may be positioned within the inner cavity 17C, but this need not always be the case. The inner cavity 17C may be delimited along a bottom thereof by the base member 17B1. However, it should be noted that the inner cavity 17C may extend outside the front sub-frame 17. The inner cavity 17C may be at least partially delimited by additional components at the front end 12F of the body 12, such as cowling, casings, body panels, fairings or the like, as described in greater detail below. In an embodiment, the inner cavity 17C is not occupied by the electric motor assembly 25 or other vehicle components, such that part of the inner cavity 17C may be used for storage, as described in greater detail below.

The body 12 includes aesthetic or design components in addition to the structural components described above. For example, and referring to FIG. 3A, the body 12 includes multiple body panels 13. The body panels 13 are objects whose function is at least partially aesthetic, decorative, or to provide styling. The body panels 13 may also or instead provide other functions such as protecting internal components of the snowmobile 10 from the elements and/or protecting an operator from moving internal components of the snowmobile 10, for example. In an embodiment, the body panels 13 are not load-bearing. In an embodiment, the body panels 13 do not support the major loads generated during operation of the snowmobile 10. In an embodiment, the front sub-frame 17 and the rear tunnel 14 support more loads than the body panels 13 during operation of the snowmobile 10. The body panels 13 may define the visible, exterior surfaces of the body 12 and of the snowmobile 10. The body panels 13 may be plastic components formed by a molding process; however, other implementations are also contemplated. The body panels 13 may be secured to the body 12 using any suitable technique. For example, in an embodiment, the body panels 13 are bolted or otherwise fastened to the load-bearing under structure of the body 12, such as to the front sub-frame 17, mid-bay 21 and/or to the rear tunnel 14. In an embodiment, one or more of the body panel(s) 13 are removably mounted to the body 12 (e.g. such as being removably mounted to the front-sub-frame 17). Non-limiting examples of fasteners for the body panel(s) 13 include bolts and rivets. Alternatively or in addition to being fastened, one or more of the body panel(s) 13 may be adhered to surfaces of the body 12 or connected using snap-fittings.

The body 12 may include different types of body panels 13. For example, and referring to FIG. 3A, the body panels 13 include one or more mid-body panel(s) 13M. The mid-body panel 13M may be located at least partially forward of the straddle seat 22 and may extend across a lateral midpoint of the body 12 which lies along the center plane CP. The mid-body panel 13M may be located at least partially rearward of the handle 20. In an embodiment, the mid-body panel 13M is symmetrical about the center plane CP. The mid-body panel 13M may be positioned rearward of the front end 12F of the body 12. In an embodiment, the mid-body panel 13M is a single, unitary component that spans laterally across the body 12. Alternatively, multiple mid-body panels 13M may be included laterally across the body 12 (e.g., one mid-body panel 13M may be provided on either side of the handle 20). The mid-body panel 13M may define an upper surface of the body 12, and may be proximate the operator when the operator is seated on the straddle seat 22.

Figure 3A:
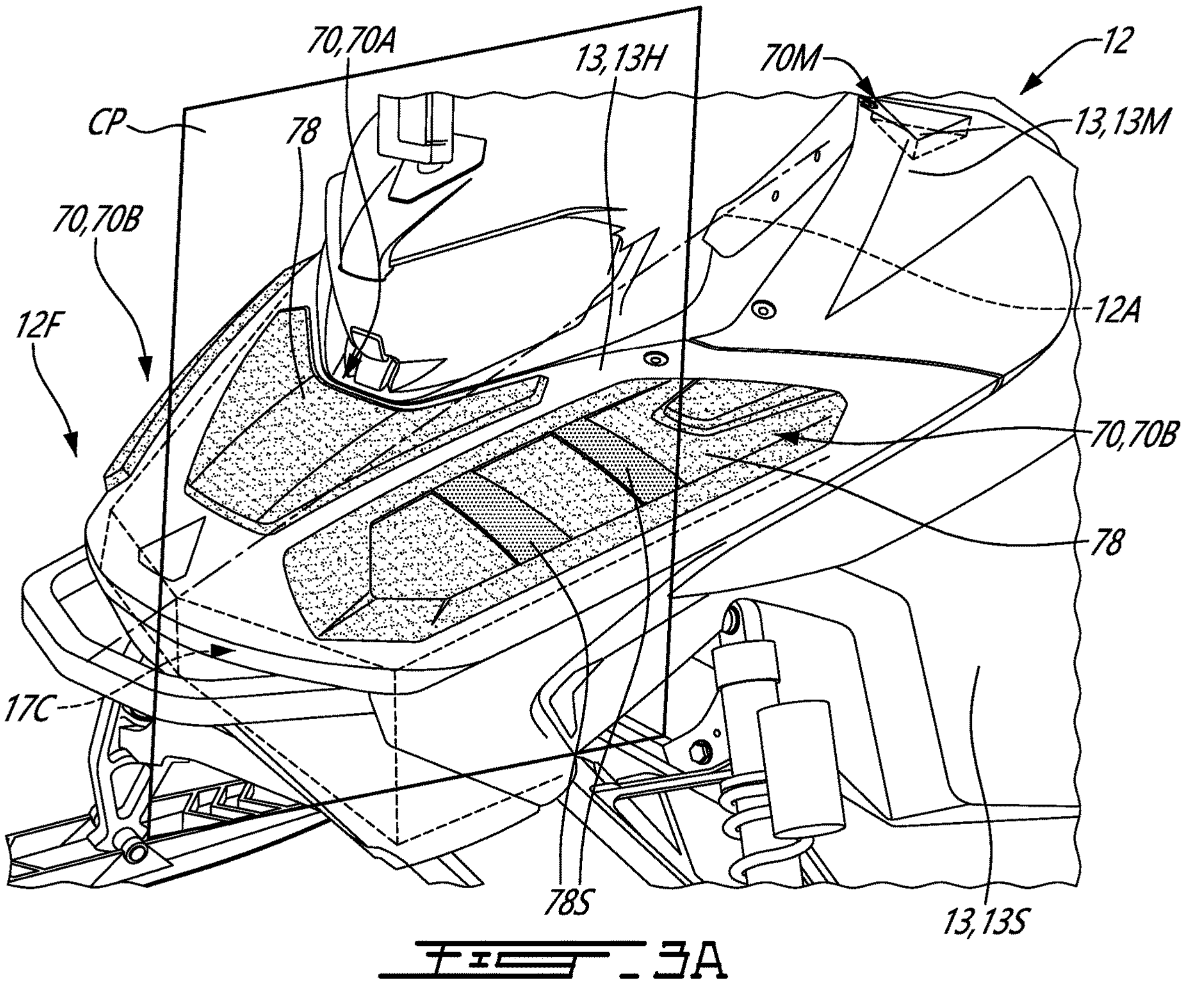
FIG. 3A is a front perspective view of part of the snowmobile of FIG. 1, showing a configuration of storage compartments.

Referring to FIG. 3A, the body panels 13 include one or more hood panel(s) 13H. The one or more hood panel(s) 13H (referred to herein in the singular for convenience) are positioned at the front of the snowmobile 10. Referring to FIG. 3A, the hood panel 13H is positioned at, or defines, the front end 12F of the body 12. The hood panel 13H is located at least partially forwardly of the mid-body panel 13M. Referring to FIG. 3A, the hood panel 13H is located forwardly of the straddle seat 22. Referring to FIG. 1, the hood panel 13H is located at least partially forwardly of the handle 20. The hood panel 13H defines an upper surface of the front end 12F of the body 12, and overlies the inner cavity 17C. The hood panel 13H thus partially delimits the inner cavity 17C. The hood panel 13H defines an upper boundary of the inner cavity 17C at the front end 12F of the snowmobile 10. In some embodiments, the hood panel 13H may at least partially overlie the electric motor assembly 25.

In one possible configuration of the body 12, and referring to FIG. 3A, the body 12 includes a single hood panel 13H. The single hood panel 13H may be a single component, body or shell that spans laterally across an upper portion of the front end 12F of the body 12. Referring to FIG. 3A, the hood panel 13H is a central body panel 13. Referring to FIG. 3A, the hood panel 13H is a central body panel 13 that is aligned, and symmetrical about, the center plane CP at the front end 12F of the body 12. In an embodiment, the hood panel 13H is bisected by the center plane CP. In an embodiment, the hood panel 13H is symmetrical about the longitudinal axis 12A of the body 12. Alternative configurations of the hood panel 13H are possible. In one example of such an alternate configuration, the hood panel 13H includes or is made up of multiple hood panel segments, which are individually or collectively mounted to the body 12. In another example of an alternate configuration, the body 12 may have two or more hood panels 13H. In an embodiment, one or more of the hood panel(s) 13H are removably mounted to a component of the front-sub-frame 17.

Figure 3B:
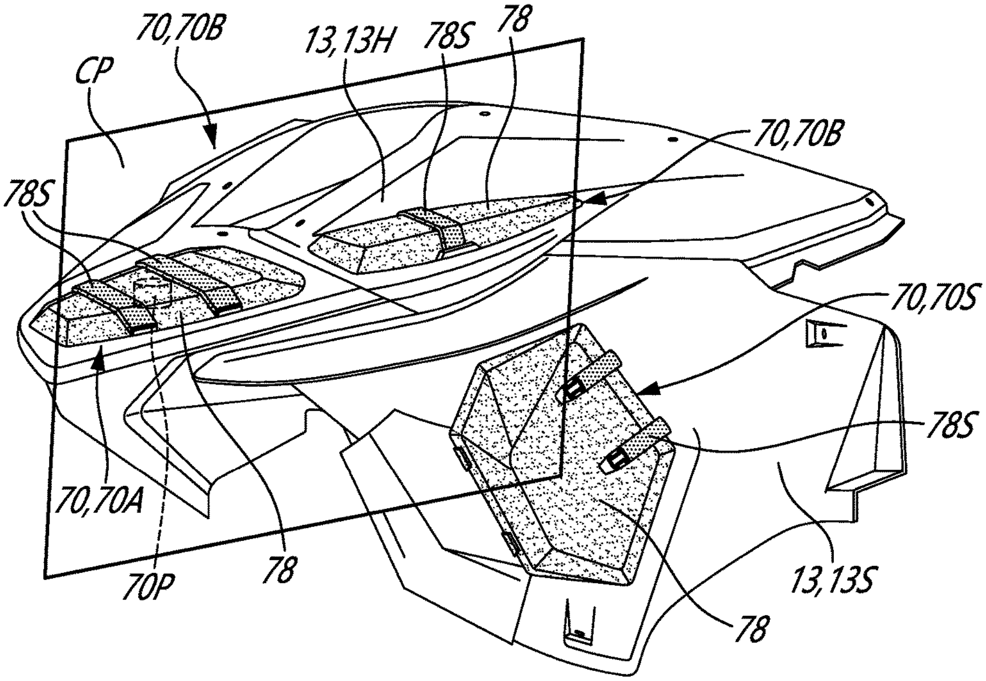
FIG. 3B is a front perspective view of part of the snowmobile of FIG. 1, showing another configuration of storage compartments.

Referring to FIGS. 3A and 3B, the body panels 13 include one or more side panel(s) 13S. The one or more side panel(s) 13S are positioned at the front of the snowmobile 10. Referring to FIGS. 3A and 3B, each side panel 13S is positioned at, or adjacent to, the front end 12F of the body 12. A front portion of each side panel 13S is located forwardly of the mid-body panel 13M. Referring to FIGS. 3A and 3B, each side panel 13H is located at least partially forwardly of the straddle seat 22. Referring to FIG. 1, each side panel 13S may be aligned with the handle 20 along the longitudinal axis 12A of the body 12. Some of each side panel 13S is forward of the handle 20, and some of each side panel 13S is aft or rearward of the handle 20. Each side panel 13S defines an exposed side surface at the front end 12F of the body 12, and is spaced laterally apart from the center plane CP. Each side panel 13S is positioned on one lateral side of the body 12. Referring to FIG. 3B, each side panel 13S may partially delimit the inner cavity 17C. Each side panel 13S may define a lateral or side boundary of the inner cavity 17C at the front end 12F of the snowmobile 10. Each side panel 13S may be spaced laterally apart or be laterally offset from the electric motor assembly 25.

The orientation of each side panel 13S may be substantially transverse to the orientation of the hood panel 13H. In an embodiment, an outer surface of the hood panel 13H may face substantially upwards (e.g., the outer surface of the hood panel 13H may be oriented at an angle of 45 degrees or less from a horizontal plane of the body 12). An outer surface of each side panel 13S may face substantially horizontally and laterally (e.g., the outer surface of each side panel 13S may be oriented at an angle of 45 degrees or less from the center plane CP of the body 12). For example, and referring to FIGS. 3A and 3B, each side panel 13S has a substantially upright or vertical orientation, and the hood panel 13H has a substantially horizontal orientation that is transverse to each side panel 13S. Referring to FIGS. 3A and 3B, the side panels 13S and the hood panel 13H are separate components which are individually attached to the body 12. In an alternate configuration, the hood panel 13H is integral with one or both of the side panels 13S.

In one possible configuration of the body 12, and referring to FIGS. 3A and 3B, the body 12 includes two side panels 13S—a left side panel 13S and a right side panel 13S. Each side panel 13S may be a single body or shell that has an axial extent defined relative to the longitudinal axis 12A at the front end 12F of the body 12. Referring to FIG. 3A, each side panel 13S is spaced laterally equidistantly from the center plane CP on opposite sides thereof. Referring to FIGS. 3A and 3B, the side panels 13S are symmetrical about the center plane CP at the front end 12F of the body 12. In an embodiment, the side panels 13S are symmetrical about the longitudinal axis 12A of the body 12. Alternative configurations of the side panel 13S are possible. In one example of such an alternate configuration, each side panel 13S includes or is made up of multiple side panel segments, which are individually or collectively mounted to the body 12. In another example of an alternate configuration, the body 12 may have more than two side panels 13S. In an embodiment, one or more of the side panel(s) 13S are removably mounted to a component of the front-sub-frame 17.

In some implementations of the snowmobile 10, there may be a portion of the volume of the inner cavity 17C that is not occupied by the electric motor assembly 25, the battery pack 31, a charger, controllers, HV electronics, or other internal components of the snowmobile 10. This unoccupied volume may be used for other purposes, such as storage, as described in greater detail below. For example, by positioning the electric motor 26 in the mid-bay 21 of the snowmobile 10, as shown in FIG. 1A, it may be possible to create storage space at the front of the snowmobile 10. In this way, designing the powertrain of an electric snowmobile in a compact manner can provide storage space at the front end 12F of the body 12. This may be contrasted with a snowmobile in which an internal combustion engine is positioned at the front, because any space around the internal combustion engine may be occupied by exhaust ducts, mufflers, a continuous variable transmission (CVT), fuel lines, etc. and thus be unavailable for storage.

Figure 4A:
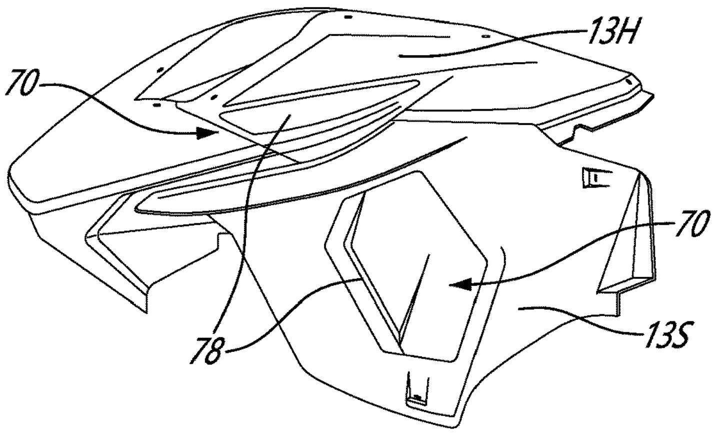
FIG. 4A is a side view of part of the snowmobile of FIG. 1, showing another configuration of storage compartments.
Figure 4B:
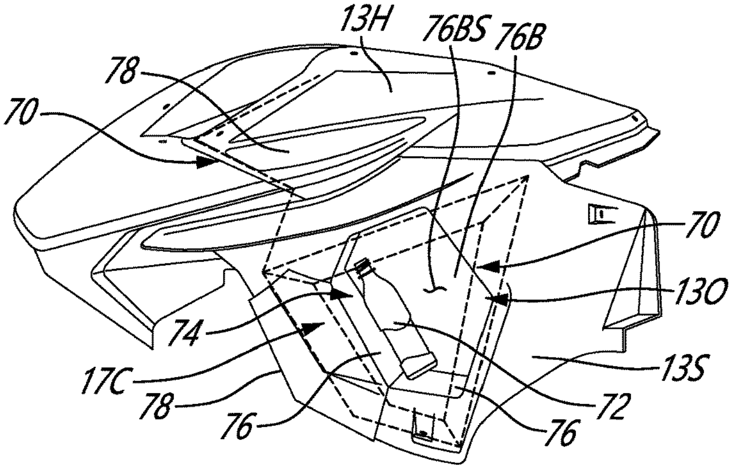
FIG. 4B is another side view of the configuration of storage compartments shown in FIG. 4A.
Figure 4C:
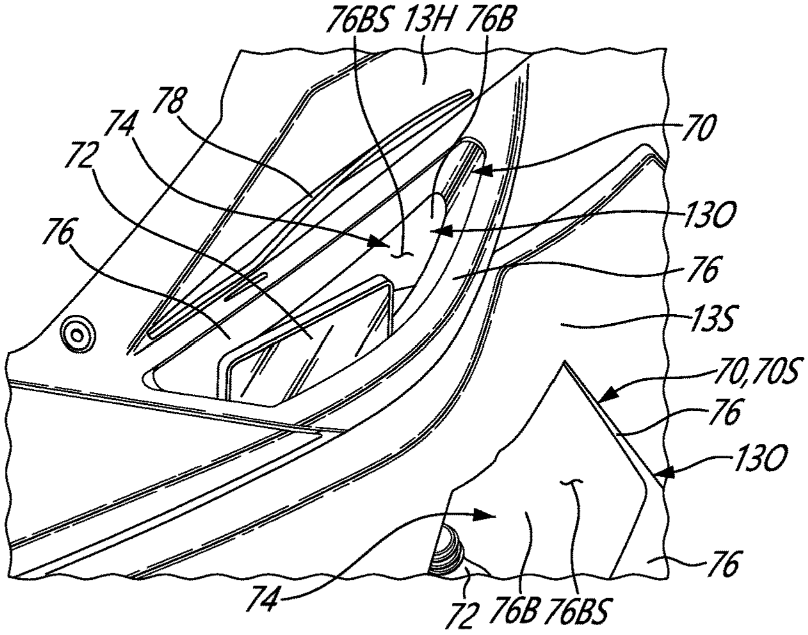
FIG. 4C is an enlarged view of part of FIG. 4A.

Referring to FIGS. 4A to 4C, the snowmobile 10 has one or more storage compartment(s) 70. The storage compartment(s) 70 are used for housing or storing items 72 including, but not limited to, personal effects, tools, food and beverages. In some embodiments, the items 72 exclude permanent, functional and/or structural components of the snowmobile 10 (i.e., the items 72 may be non-permanent, non-functional and/or non-structural for the snowmobile 10, at least when disposed within the storage compartment(s) 70). For example, the items 72 might not include any components of the powertrain 16 or the body 12. The items 72 may be added to and removed from the storage compartments(s) 70 at the discretion of a user.

The storage compartment(s) 70 allow for storing items 72 within a portion of the body 12, and optionally for protecting the items 72 from the environment outside of the body 12. The storage compartment(s) 70 are partially or fully enclosed volumes meant for storage that are located within the perimeter of the body 12, and which may form part of the total volume of the inner cavity 17C. In an embodiment, the storage compartment(s) 70 are separate internal sections of the body 12 in which certain items 72 can be kept separate from a remainder of the inner cavity 17C. The storage compartment(s) 70 may be sealed off or otherwise separated from the inner cavity 17C. The internal storage volume defined by the storage compartment(s) 70, which may be used to store the items 72, may be accessible via opening(s) 13O or apertures in one or more of the hood panel 13H and the side panel(s) 13S, so that the items in the storage compartment(s) 70 may be retrieved or placed. The internal storage volume defined by the storage compartment(s) 70 may also or instead be accessible via opening(s) 13O that are revealed by pivoting, displacing, removing or partially removing one or more of the hood panel 13H and the side panel(s) 13S. The storage compartment(s) 70 may thus define volumes which extend into the body 12 from one or both of the hood panel 13H and the side panel(s) 13S. The storage compartment(s) 70 may be disposed at the front end 12F of the body 12, partially or entirely forward of the seat 22 and/or of the handle 20.

The storage compartment(s) 70 help to increase the cargo capacity of the snowmobile 10 without adding volume outside of the body 12. The storage compartment(s) 70 help to increase the cargo capacity of the snowmobile 10 by using only the internal bodywork capacity of the snowmobile 10. The storage compartment(s) 70 may allow the operator to transport more personal effects while operating the snowmobile 10 without adding external volume on or to the snowmobile 10. The storage compartment(s) 70 allow for using internal space in the front of the snowmobile 10 that is available due to the compact configuration of the electric powertrain described above.

Referring to FIGS. 4A to 4C, the snowmobile 10 includes multiple storage compartments 70. Each storage compartment 70 has a depth extending into the inner cavity 17C, an axial extent defined relative to the longitudinal axis 12A, and a span along a vertical direction, all of which collectively define a storage volume 74. The storage volume 74 may occupy a portion of the volume of the inner cavity 17C. Each storage compartment 74 includes, or is defined by, one or more (e.g., side) wall(s) 76. The wall(s) 76 may extend inwardly into the body 12. More particularly, the wall(s) 76 may extend into the inner cavity 17C from the opening 13O in the corresponding body panel 13, and therefore provide depth to the storage compartment 70. The wall(s) 76 may circumscribe or delimit the storage volume 74 of each storage compartment 70. In an embodiment, one or more of the storage compartments 70 has a single wall 76 which circumscribes all of the opening 13O in the body panel 13. The single wall 76 includes multiple wall segments extending inwardly from the opening 13O, each of which may be angled relative to another to provide any desired shape to the storage volume 74. In such an embodiment of a single wall 76, the wall 76 and its wall segments may be integrally formed (e.g., have a unitary construction) with the body panel 13 to form a single or monolithic component having a storage compartment 70. In another possible embodiment, one or more of the storage compartments 70 has multiple walls 76. Each of the multiple walls 76 extends inwardly from the opening 13O in the body panel 13, and collectively circumscribe the opening 13O. Each of the multiple walls 76 are joined together at any angle relative to one another to provide any desired shape to the storage volume 74. The walls 76 of the storage compartments 70 may have any orientation, including substantially horizontal, substantially vertical, or any orientation between the horizontal and vertical, as described in greater detail below.

In an embodiment, and referring to FIGS. 4B and 4C, one or more of the storage compartment(s) 70 includes one or more bottom wall(s) 76B. The bottom wall 76B is connected to the wall 76 defining the depth of the storage volume 74.

The bottom wall 76B may delimit the back or bottom of the storage volume 74, and may define the extent of the depth of the storage volume 74. The bottom wall 76B may define a bottom surface 76BS of the storage compartment 70. The bottom wall 76B may have any suitable orientation (e.g. upright, horizontal, and any orientation therebetween) depending on orientation of the depth-defining wall 76, as described in greater detail below. In an embodiment, and referring to FIGS. 4B and 4C, the bottom wall 76B is transverse to the wall 76. In an alternate embodiment, an example of which is described in greater detail below, the storage compartment 70 is devoid of the bottom wall 76B such that the storage volume 74 has no bottom boundary. In yet another alternate embodiment, the storage compartment 70 is devoid of the bottom wall 76B such that the storage volume 74 has no bottom boundary, and the items 72 are supported by/from hooks, nets and/or other attachments on the wall 76. In the configuration where the wall 76 and its wall segments are integrally formed with the body panel 13 to form a single or monolithic component having a storage compartment 70, the bottom wall 76B may also be integrally formed with these components to be part of the single or monolithic component. Such a configuration of the body panel 13 may be achieved by molding the body panel 13 with the desired recesses and walls. Examples of materials that may be used to make such a one-piece body panel 13 include plastic, fiberglass, carbon fibre, and blast-fiber reinforced that is injection molded with glass fiber to get a solid object.

In an embodiment, the wall(s) 76 and/or the bottom wall(s) 76B of the storage compartment(s) 70 may be formed separately from the body panel(s) 13. For example, the wall(s) 76 and/or the bottom wall(s) 76B may be formed by an insert that at least partially defines the storage volume 74 and the opening 13O. The insert may be positioned within the inner cavity 17C to form the storage compartment(s) 70. The opening 13O of the insert may be selectively covered by the body panel 13 to enclose the storage volume 74. Examples of materials that may be used to make such a insert include plastic, fiberglass, carbon fibre, and blast-fiber reinforced that is injection molded with glass fiber to get a solid object. However, in some embodiments, the insert may be made from a flexible material. For example, the insert may be a waterproof bag that is sized and shaped to fit within the inner cavity 17C.

In an embodiment, an example of which is shown in FIGS. 4A to 4C, each storage compartment 70 may be closed to prevent the items 72 from exiting the storage volume 74, to seal the items 72 within the storage volume 74, and/or to prevent the ingress of contaminants or other materials from the outside environment into the storage volume 74. To achieve such functionality, one or more of the storage compartment(s) 70 may be provided with a door 78. The door 78, sometimes referred to herein as a “hatch”, may be any suitable panel, closure, lid, etc. which is moveably mounted to the body 12, and which is displaceable relative to the body 12 to cover and reveal the opening 13O in the body panel 13. When the door 78 reveals the opening 13O, access is provided to the storage volume 74 and to the items 72 therein. The storage compartment(s) 70 may thus be accessed via a door 78 or hatch in the hood panel 13H and/or in the side panel 13S. In some embodiments, as discussed elsewhere herein, the hood panel 13H and/or the side panel 13S themselves are movable to provide a door 78 for covering and revealing the opening 13O into a storage compartment 70.

The door 78 may be moveably mounted to the body panel 13 or to the wall 76 of the storage compartment 70. By “moveably mounted”, it is understood that the door 78 is displaceable relative to a component of the body 12 when covering and revealing the opening 13O. This functionality of the door 78 may take different forms. For example, and referring to FIGS. 4A and 4B, the door 78 is pivotably mounted to the body panel 13 with any suitable hinge. The door 78 is pivotable between a closed position (see FIG. 4A) and an open position (see FIGS. 4B and 4C). When pivoting from the closed position to the open position, the door 78 displaces or pivots in a forward direction to the open position. By hinging or pivoting away from where the operator is seated on the saddle seat 22, the door 78 may be easier to open, and the items 72 in the storage compartment 70 easier to access, when the operator is seated. Other implementations of the door 78 being moveably mounted to the body panel 13 are also contemplated. For example, the door 78 may be slidable relative to the body panel 13 to cover and reveal the opening 13O.

Various combinations of the number and shape of the storage compartment(s) 70 are possible, some of which are now described in greater detail.

One possible combination of the number and shape of the storage compartment(s) 70 is now described with reference to FIG. 3A. The snowmobile 10 has multiple storage compartments 70, most of which are on the hood panel 13H. The side panels 13S are devoid of storage compartments 70, such that the configuration of storage compartments 70 of FIG. 3A may be referred to as a “cargo hood”. The wall 76 of each storage compartment 70 has a substantially upright orientation and extends into the inner cavity 17C from the hood panel 13H. The openings 13O are in the hood panel 13H. The doors 78 may be moveably mounted to the hood panel 13H and may be displaceable relative to the hood panel 13H to cover and reveal the openings 13O. Referring to FIG. 3A, the door 78 of each storage compartment 70 may be removably mounted to the hood panel 13H. The doors 78 of the storage compartments 70 may be removed from the hood panel 13H to reveal the openings 13O, and may be attached to the hood panel 13H to conceal the openings 13O and close off the storage volume 74. Referring to FIG. 3A, straps 78S may be used to securely fasten the doors 78 to the hood panel 13H. The straps 78S may include buckles with snap fit connections to fasten the doors 78 to the hood panel 13H. Referring to FIG. 3A, there are three storage compartments 70, including a first hood panel storage compartment 70A, and two second hood panel storage compartments 70B spaced laterally apart from the first hood panel storage compartment 70A. The second hood panel storage compartments 70B are spaced laterally apart from the center plane CP. The first hood panel storage compartment 70A is aligned with the center plane CP. The first hood panel storage compartment 70A is symmetrical about the center plane CP. Each of the first and second hood panel storage compartments 70A,70B may have multiple internal compartments. One or more of the first and second hood panel storage compartments 70A,70B may have a USB port and/or 12V charger.

Referring to FIG. 3A, the storage compartments 70 include one or more mid-body storage compartment(s) 70M. The mid-body storage compartment(s) 70M are accessible via an opening in the mid-body panel 13M. The mid-body storage compartment(s) 70M may be relatively small so as to store personal items 72 such as a mobile phone or wallet, such that these personal effects may be kept close to where the operator is seated and made accessible when the operator is seated.

Another possible combination of the number and shape of the storage compartment(s) 70 is now described with reference to FIG. 3B. The snowmobile 10 has multiple storage compartments 70, some of which are on the hood panel 13H and some of which are on the side panels 13S. The storage compartments 70 includes two first hood panel storage compartments 70A and two second hood panel storage compartments 70B, where each of the first and second hood panel storage compartments 70A, 70B are spaced laterally apart from the center plane CP. The wall 76 of each hood panel storage compartment 70A,70B has a substantially upright orientation and extends into the inner cavity 17C from the hood panel 13H. The openings 13O of each hood panel storage compartment 70A, 70B are in the hood panel 13H. The doors 78 of each hood panel storage compartment 70A, 70B may be moveably mounted to the hood panel 13H and are displaceable relative to the hood panel 13H to cover and reveal the openings 13O. Referring to FIG. 3B, the door 78 of each hood panel storage compartment 70A, 70B may be removably mounted to the hood panel 13H using straps 78S. The doors 78 of the hood panel storage compartments 70A, 70B may be removed from the hood panel 13H to reveal the openings 13O, and may be attached to the hood panel 13H to conceal the openings 13O and close off the storage volume 74.

Still referring to FIG. 3B, the storage compartments 70 include two side panel storage compartments 70S, each of which is accessible via one of the two side panels 13S. The two side panel storage compartments 70S are disposed on opposite sides of the center plane CP. The two side panel storage compartments 70S are spaced laterally apart equidistantly from the center plane CP. For each side panel storage compartment 70S, the wall 76 extends into the inner cavity 17C from one of the side panels 13S. The openings 13O are formed in the side panels 13S. The doors 78 of the side panel storage compartment 70S may be moveably mounted to the side panels 13S and may be displaceable relative to the side panels 13S to cover and reveal the openings 13O. Referring to FIG. 3B, the door 78 of each side panel storage compartment 70S may be removably mounted to one of the side panels 13S. The doors 78 of the side panel storage compartments 70S may be removed from each of the side panels 13S to reveal the openings 13O, and may be attached to each of the side panels 13S to conceal the openings 13O and close off the storage volume 74. Referring to FIG. 3B, straps 78S may be used to securely fasten the doors 78 to the hood and side panels 13H, 13S. Each of the hood panel storage compartments 70A, 70B and side panel storage compartments 70S may have multiple internal compartments. One or more of the hood panel storage compartments 70A, 70B and the side panel storage compartments 70S may have a USB port and/or 12V charger. One or more of the hood panel storage compartments 70A, 70B and the side panel storage compartments 70S may have a charging port 70P for charging the electrical batteries 30 of the snowmobile 10. The configuration of the storage compartments 70 in FIG. 3B provides storage compartments 70 in both the hood and side panels 13H, 13S.

Yet another possible combination of the number and shape of the storage compartment(s) 70 is shown in FIGS. 4A to 4C. The description of the storage compartments 70 of FIGS. 3A and 3B above applies mutatis mutandis to the storage compartments 70 of FIGS. 4A to 4C. The configuration of the storage compartments 70 in FIGS. 4A to 4C provides storage compartments 70 in both the hood and side panels 13H, 13S. In FIG. 4A, the doors 78 of the storage compartments 70 are in a closed position to at least partial seal the storage volumes 74, whereas in FIGS. 4B and 4C the doors 78 are pivoted to an open position to expose the openings 13O and allow access to the storage volumes 74. The bottom walls 76B of the side panel storage compartments 70S have an upright orientation.

Figure 5:
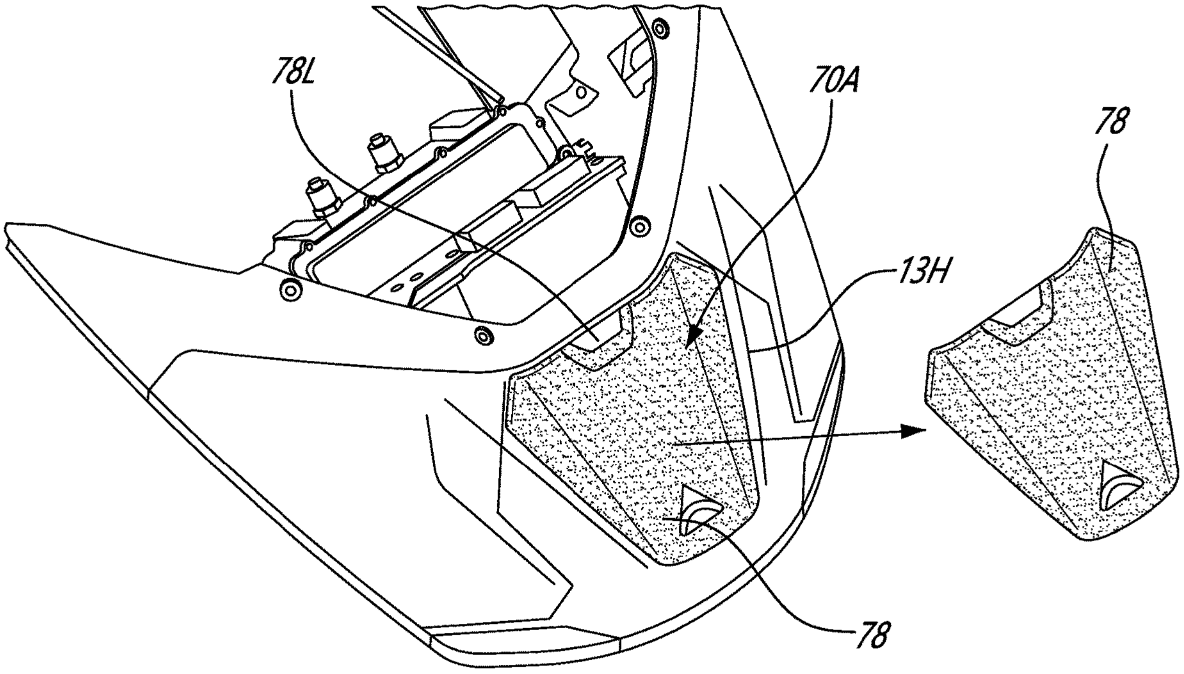
FIG. 5 is a front perspective view of part of the snowmobile of FIG. 1, showing another configuration of a storage compartment.

Yet another possible combination of the number and shape of the storage compartment(s) 70 is shown in FIG. 5. The description of the storage compartments 70 of FIGS. 3A to 4C above applies mutatis mutandis to the storage compartment 70 of FIG. 5. The configuration of the storage compartment 70 in FIG. 5 provides a single storage compartment 70 in only the hood panel 13H. Referring to FIG. 5, the door 78 of the single hood panel storage compartment 70A is removable (e.g., releasably installed) as shown by the arrow to reveal the storage volume 74 of the hood panel storage compartment 70A. The hood panel storage compartment 70A may have a latch 78L for selectively attaching and releasing the door 78.

Figure 6A:
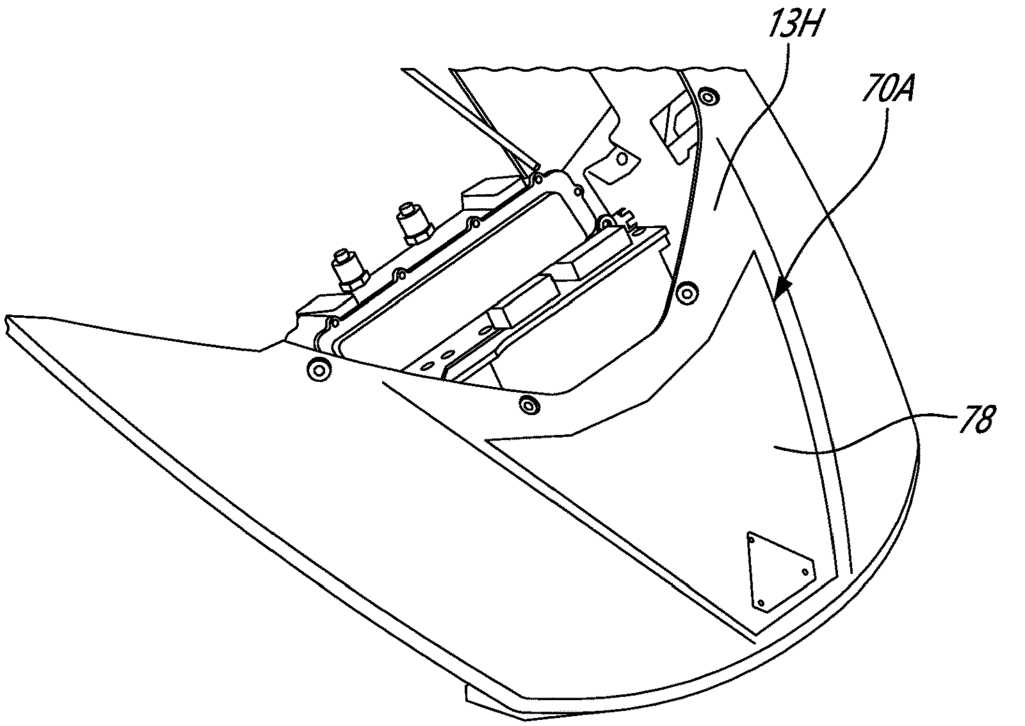
FIG. 6A is a front perspective view of part of the snowmobile of FIG. 1, showing another configuration of a storage compartment.
Figure 6B:
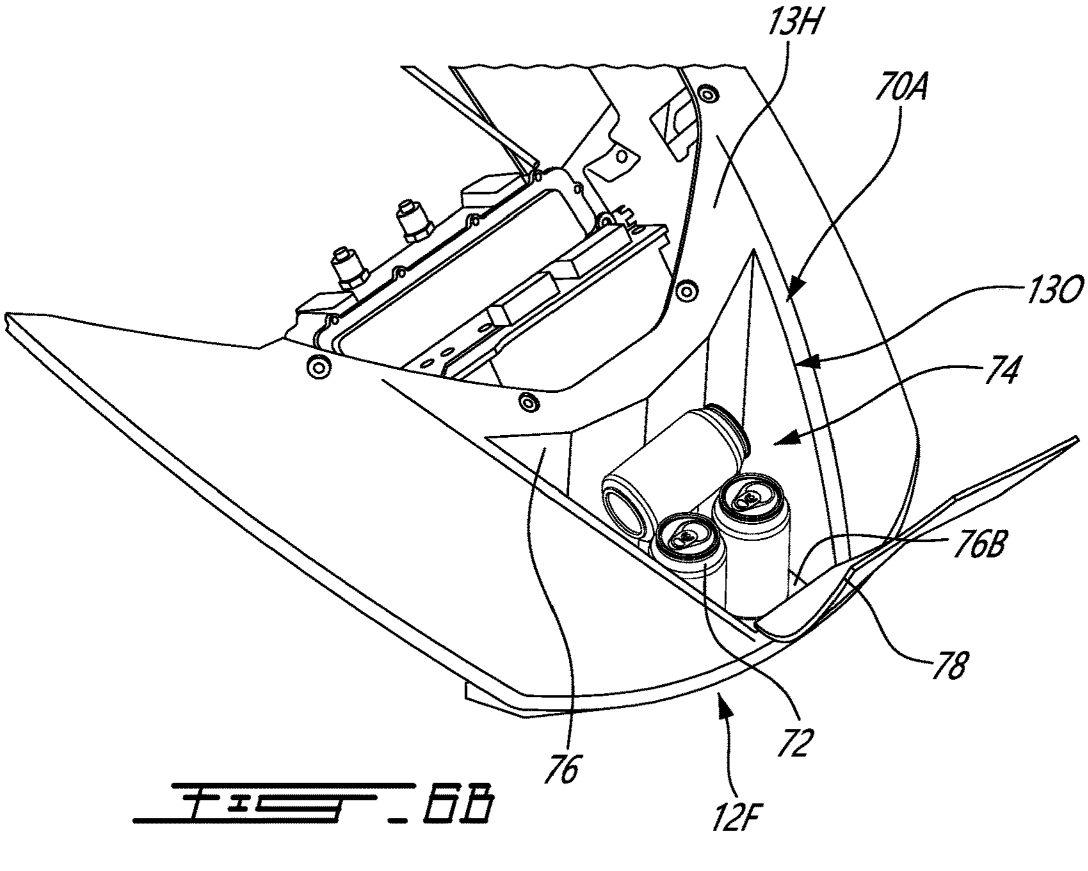
FIG. 6B is another front perspective view of the configuration of the storage compartment shown in FIG. 6A.

Yet another possible combination of the number and shape of the storage compartment(s) 70 is shown in FIGS. 6A and 6B. The description of the storage compartments 70 of FIGS. 3A to 5 above applies mutatis mutandis to the storage compartment 70 of FIGS. 6A and 6B. The configuration of the storage compartment 70 in FIGS. 6A and 6B provides a single storage compartment 70A in only the hood panel 13H. The door 78 of the single hood panel storage compartment 70A is hingedly or pivotably attached to a front end of the hood panel 13H, and pivots in the forward direction to open the door 78 and to reveal the opening 13O in the hood panel 13H, and to reveal the items 72 in the storage volume 74 of the hood panel storage compartment 70A. The wall 76 of the hood panel storage compartment 70A has an upright orientation. The bottom wall 76B of the hood panel storage compartment 70A has a horizontal orientation. The storage volume 74 tapers or narrows in a direction toward the front end 12F of the body 12.

Figure 7A:
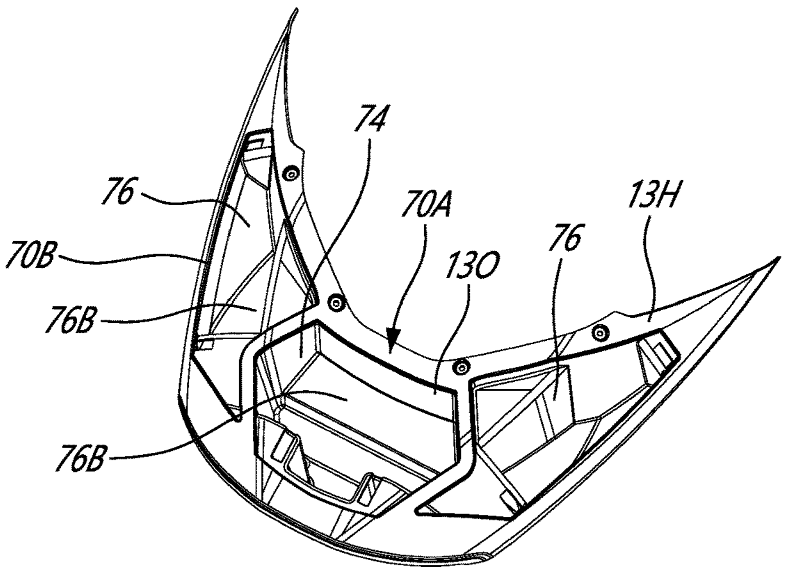
FIG. 7A is a perspective view of part of the snowmobile of FIG. 1, showing another configuration of storage compartments.
Figure 7B:
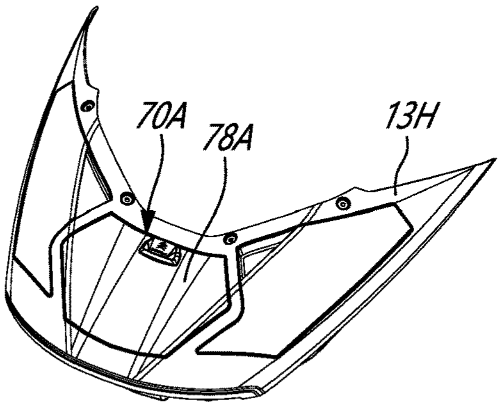
FIG. 7B is a perspective view of the storage compartments of FIG. 7A with doors.
Figure 7C:
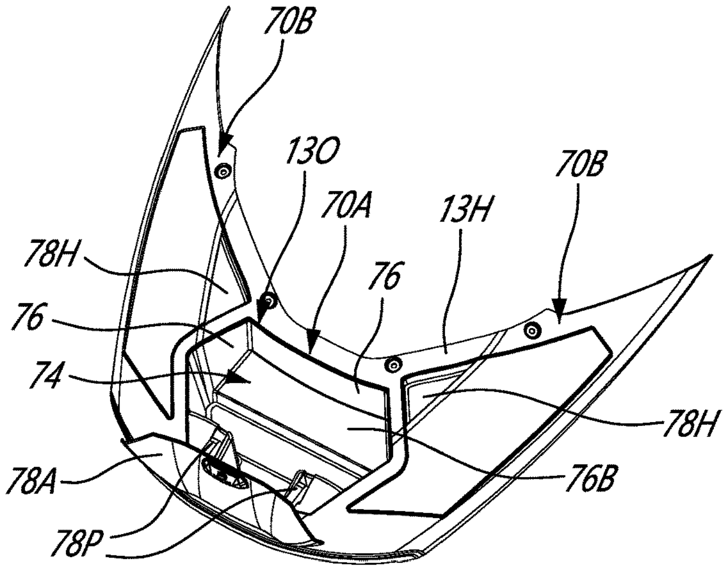
FIG. 7C is another perspective view of the storage compartments of FIG. 7A with doors.

Yet another possible combination of the number and shape of the storage compartment(s) 70 is shown in FIGS. 7A to 7C. The description of the storage compartments 70 of FIGS. 3A to 6B above applies mutatis mutandis to the storage compartments 70 of FIGS. 7A to 7C. The configuration of the storage compartments 70 in FIGS. 7A to 7C provides three storage compartments 70 in the hood panel 13H. The two second hood panel storage compartments 70B are spaced laterally apart from the first hood panel storage compartment 70A. The second hood panel storage compartments 70B are spaced laterally apart from the center plane CP. The first hood panel storage compartment 70A is aligned with the center plane CP. The door 78A of the first hood panel storage compartment 70A is hingedly or pivotably attached to a front end of the hood panel 13H, and pivots in the forward direction to open the door 78A and to reveal the opening 13O in the hood panel 13H, and to reveal the storage volume 74 of the first hood panel storage compartment 70A. The door 78A includes pivot arms 78P extending into recesses formed in the hood panel 13H. The pivots arms 78P are mounted to hinges within the body 12. The walls 76 of the hood panel storage compartments 70A, 70B have upright orientations. The bottom walls 76B of the hood panel storage compartments 70A,70B have horizontal orientations. Each of the second hood panel storage compartments 70B are provided with hand inserts 78H so that the operator can insert their hand under the doors 78 of the second hood panel storage compartments 70B to remove the doors 78.

Figure 8A:
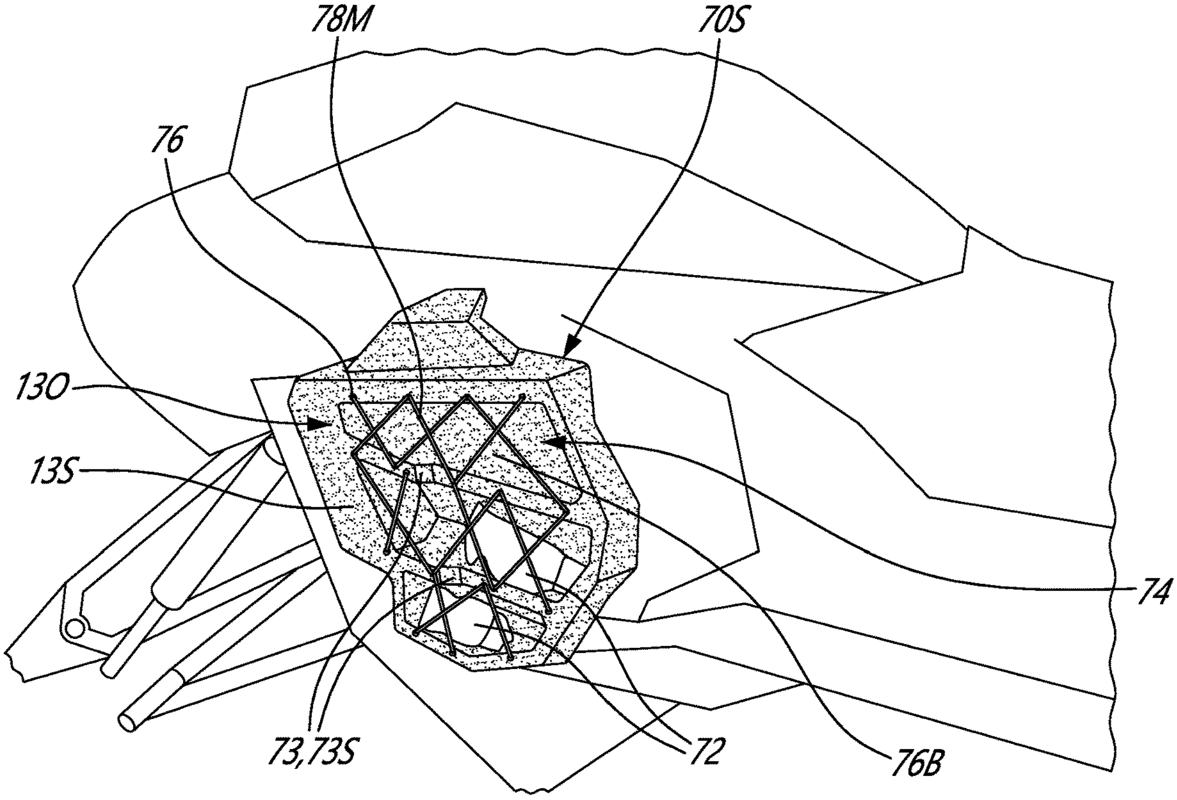
FIG. 8A is a perspective view of part of the snowmobile of FIG. 1, showing another configuration of storage compartments.
Figure 8B:
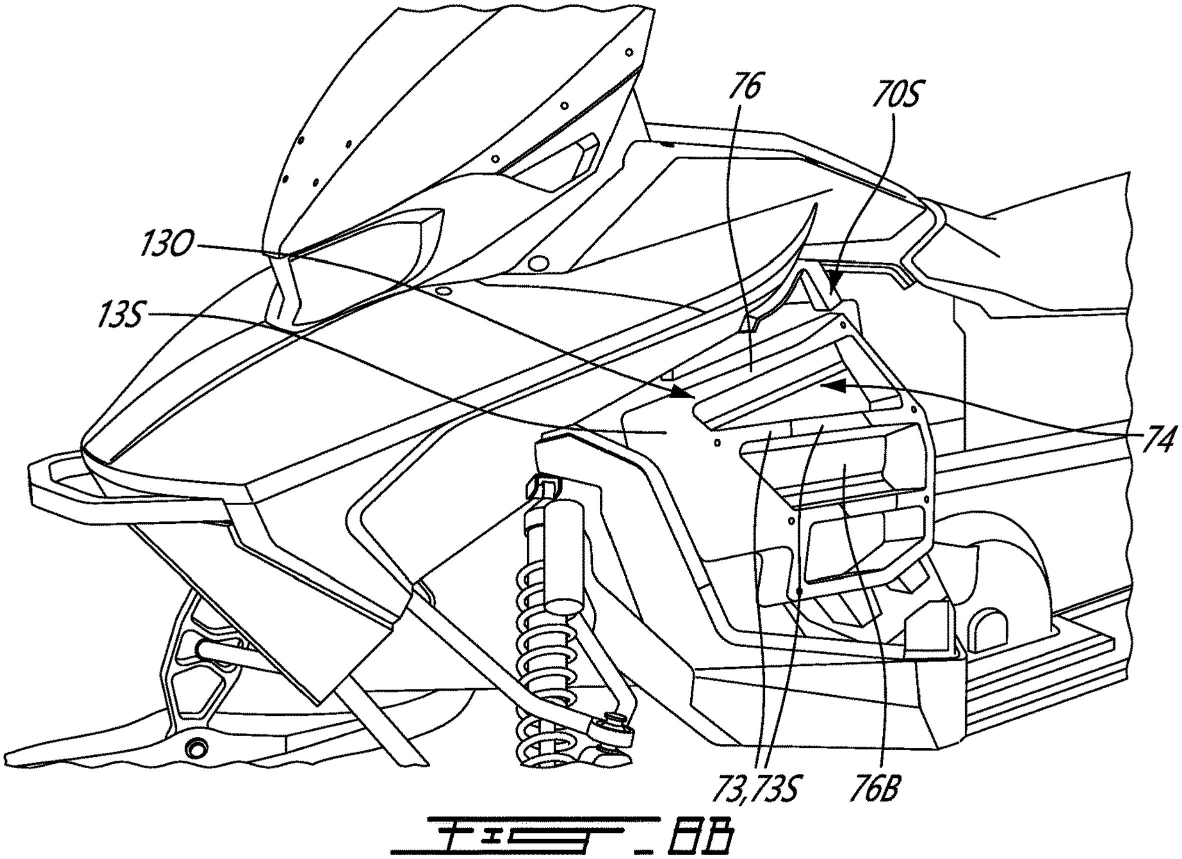
FIG. 8B is another perspective view of the configuration of storage compartments shown in FIG. 8A.

Yet another possible combination of the number and shape of the storage compartment(s) 70 is shown in FIGS. 8A and 8B. The description of the storage compartments 70 of FIGS. 3A to 7C above applies mutatis mutandis to the storage compartments 70 of FIGS. 8A and 8B. The configuration of the storage compartments 70 in FIGS. 8A and 8B provides two side panel storage compartments 70S, each one in a corresponding side panel 13S. In the configuration of storage compartments 70 of FIGS. 8A and 8B, only the side panels 13S have storage compartments 70. At least some of the walls 76 of each side panel storage compartment 70S have a substantially horizontal orientation and extend into the inner cavity 17C from each side panel 13S. The openings 13O are in the side panels 13S. The side panel storage compartments 70S of FIGS. 8A and 8B have meshing 78M or netting that can be attached to hooks or other attachments to prevent the items 72 from exiting the storage volumes 74.

Referring to FIGS. 8A and 8B, each side panel storage compartment 70S has one or more divider(s) 73. The dividers 73 are located vertically between uppermost and lowermost portions of the wall 76 and are vertically spaced apart. The dividers 73 allow for partitioning the storage volume 74 of each side panel storage compartment 70S, so that the items 72 may be stored vertically apart. In an embodiment, the dividers 73 are, or form, shelves 73S. The shelves 73S protrude laterally outwardly from the bottom wall 76B and have an orientation substantially parallel to the depth-defining walls 76 of the side panel storage compartments 70S.

In some embodiments, the walls 76 and/or the shelves 73S of the storage compartments 70 shown in FIGS. 3A to 8B may be structural or load-bearing components. For example, the walls 76 and/or the shelves 73S may extend from the side panel 13S toward internal structures of the body 12, such as the front sub-frame 17 and/or electric motor assembly 25, for example, and optionally may abut these internal structures. This configuration may allow the side panel storage compartments 70S to transfer external loads from the side panel 13S to internal structures of the body 12. This may help to prevent damage to the side panels 13S in the event that the snowmobile 10 falls on one of its sides. In such a situation, the load-bearing walls 76 and/or dividers 73 may prevent the side panels 13S from bending and becoming damaged due to the weight of the snowmobile 10 when lying on its side. In such a configuration, each side panel storage compartment 70S may both reinforce the side panel 13S and in addition to providing space for cargo.

Figure 9:
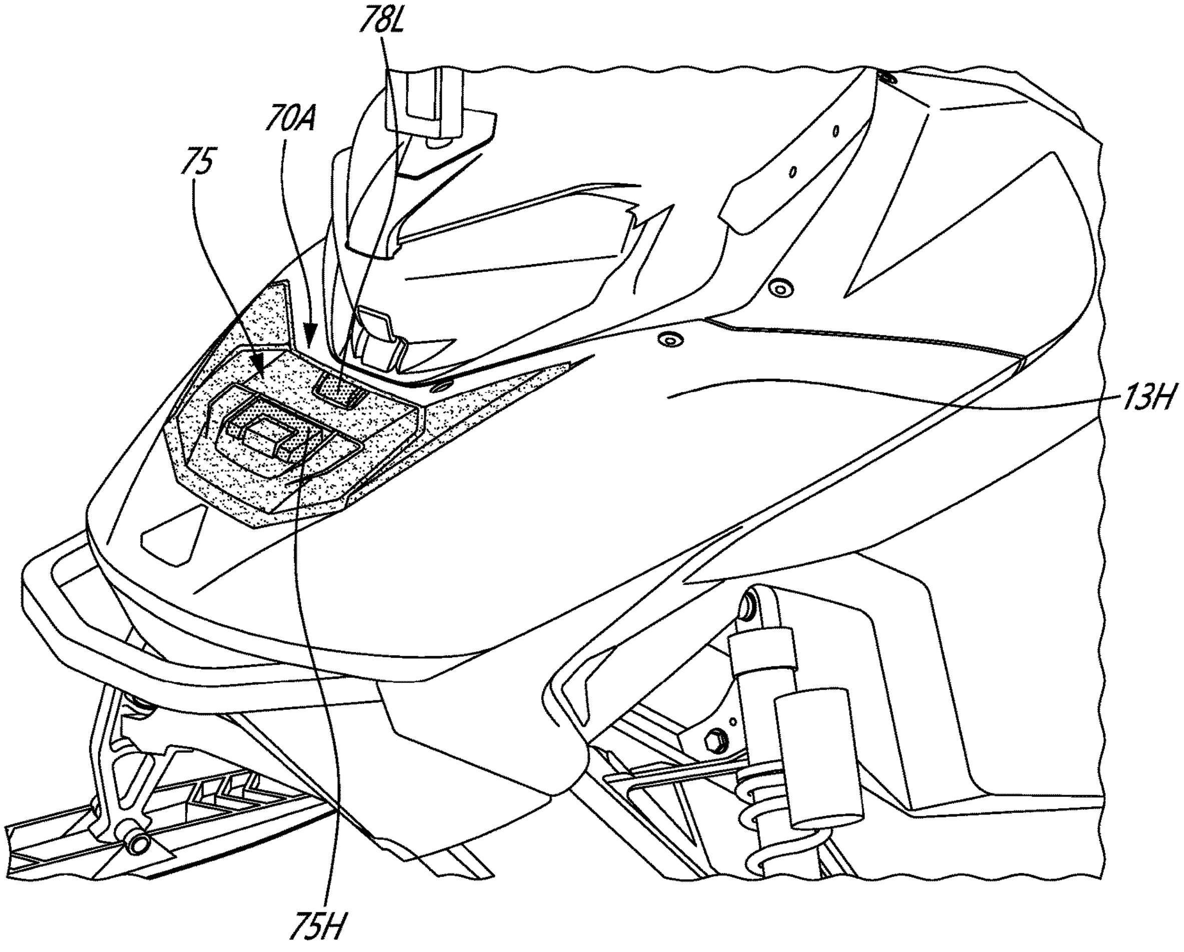
FIG. 9 is a perspective view of part of the snowmobile of FIG. 1, showing another configuration of a storage compartment.
Figure 10B:
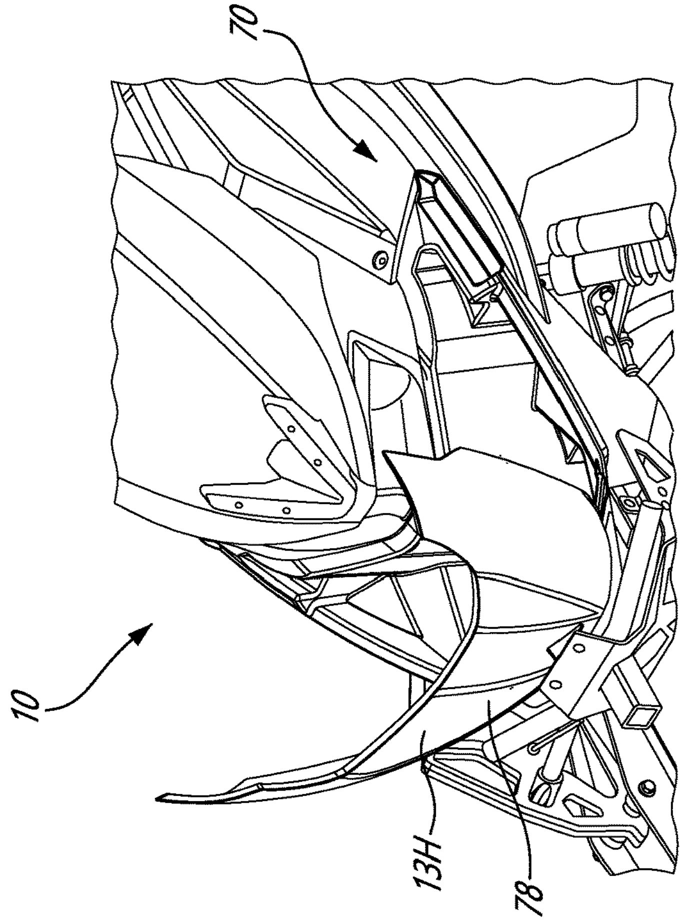
FIG. 10B is a perspective view of the storage compartment of FIG. 10A shown together with a forward portion of the snowmobile of FIG. 1.
Figure 10A:
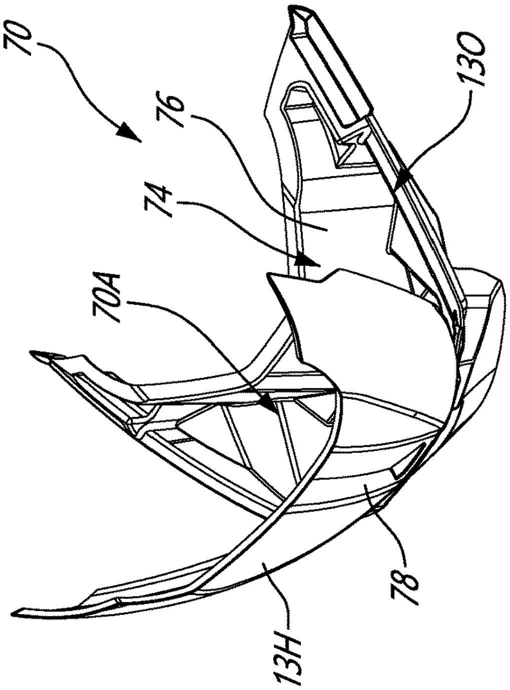
FIG. 10A is a perspective view of a storage compartment coverable by a hood panel of the snowmobile of FIG. 1.
Figure 10D:
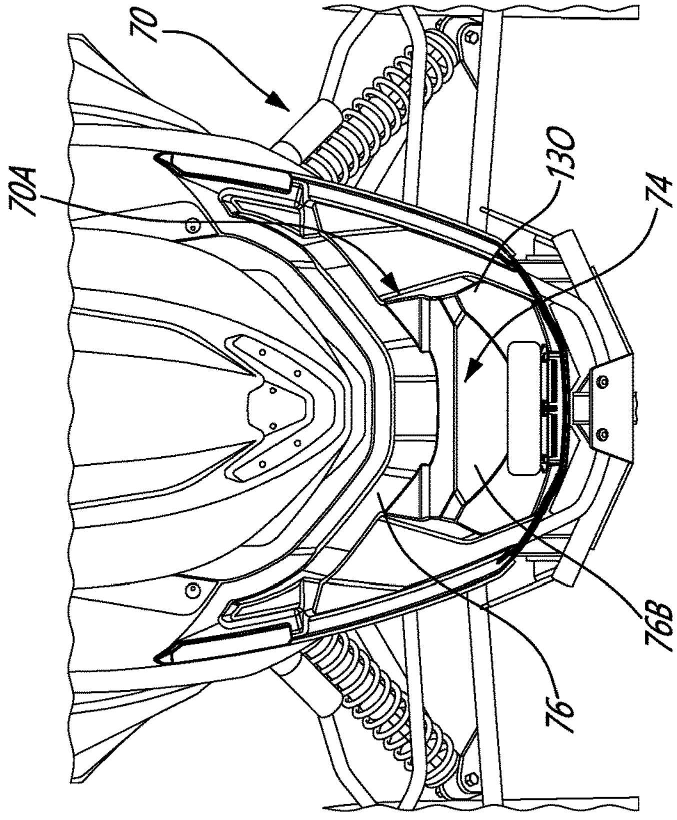
FIG. 10D is a top plan view of the forward portion of the snowmobile of FIG. 10B, with the hood panel removed.
Figure 10C:
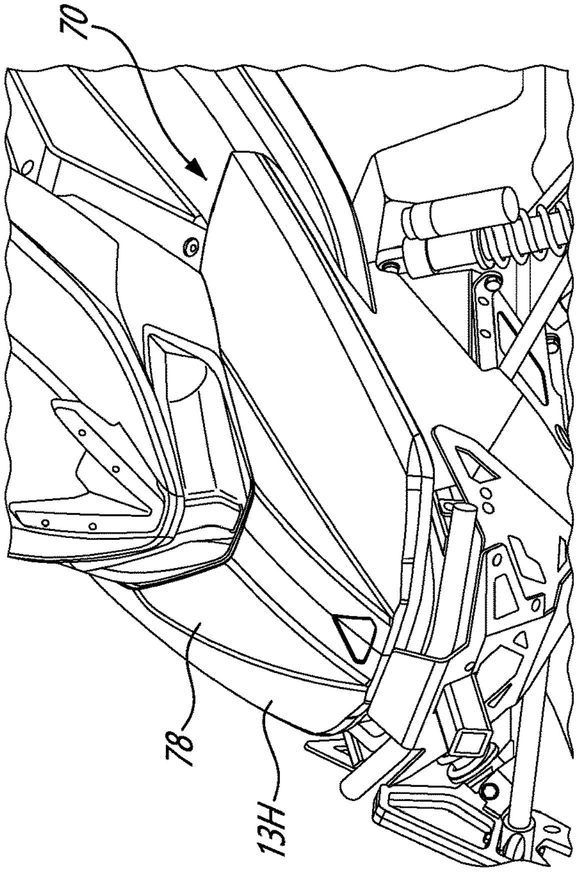
FIG. 10C is a perspective view of the forward portion of the snowmobile of FIG. 10B, with the hood panel closed.

Yet another possible combination of the number and shape of the storage compartment(s) 70 is shown in FIG. 9. The description of the storage compartments 70 of FIGS. 3A to 8B above applies mutatis mutandis to the storage compartment 70 of FIG. 9. The configuration of the storage compartment 70 in FIG. 9 provides a single storage compartment 70 in only the hood panel 13H. A storage container 75 is removably insertable into the hood panel storage compartment 70A through the opening 13O in the hood panel 13H. In this way, the storage container 75 may be releasable installed in the inner cavity 17C. The hood panel storage compartment 70A may be devoid of a depth-defining wall 76. The hood panel storage compartment 70A may be devoid of a bottom wall 76B such that the storage volume 74 has no bottom boundary. The hood panel storage compartment 70A may be defined only by the opening 13O in the hood panel 13H. The storage container 75 is any baggage, trunk, case, bag, pouch, or other enclosed body which defines a volume for storing the items 72. The storage container 75 has handle 75H for seizing the storage container 75 and pulling it out of the hood panel 13H, and for transporting the storage container 75 once freed from the hood panel 13H. The hood panel storage compartment 70A has a latch 78L for selectively attaching and releasing the storage container 75 to the hood panel 13H.

FIGS. 10A to 10D illustrate a further embodiment of the storage compartment(s) 70. The description of the storage compartments 70 of FIGS. 3A to 8B above applies mutatis mutandis to the storage compartment 70 of FIGS. 10A to 10D. The configuration of the storage compartment 70 in FIGS. 10A to 10D provides a single hood panel storage compartment 70A. The door 78, which covers the opening 13O to the hood panel storage compartment 70A, is formed from the hood panel 13H. As such, the hood panel 13H provides the door 78 to cover and reveal the opening 13O of the hood panel storage compartment 70A. In some embodiments, a further door or hatch could be provided under the hood panel 13H to further close and/or seal the storage compartment 70A. The hood panel storage compartment 70A includes the substantially vertical wall 76 (e.g., a side wall) and the substantially horizontal bottom wall 76B. The wall 76 may extend into the inner cavity 17C from the opening 13O and/or at least partially delimit the opening 13O. The bottom wall 76B may include multiple horizontal surfaces at different positions along the vertical axis. In this way, the hood panel storage compartment 70A in FIGS. 10A to 10D may have multiple different levels on which to store cargo. Dividers may be included to segregate the different levels within the storage compartment 70A.

FIGS. 10A to 10D illustrate an example of the storage compartment 70 defining the opening 13O that is selectively closable by the hood panel 13H. The hood panel 13H is moveably mounted to the body 12 of the snowmobile 10 and displaceable relative to the body 12 to cover and reveal the opening 13O. In the illustrated example, the hood panel 13H is pivotably mounted to the body 12 from an open position shown in FIGS. 10A, 10C and 10D that reveals the opening 13O to a closed position shown in FIG. 10C that covers the opening 13O. A forward edge of the hood panel 13H may be coupled to the body 12 by a hinge, for example. A rear edge of the hood panel 13H may be releasably coupled to the body 12 using a latch, for example, to allow the hood panel 13H to pivot in a forward direction. A snap fit connection may also or instead be used to couple the rear edge of the hood panel 13H to the body 12 and hold the hood panel 12H in the closed position. This snap fit connection may include two holes in the hood panel 13H that are sized and shaped to receive two plastic posts on the body 12. In some embodiments, the entire hood panel 13H may also or instead be removably mounted to the body 12 to cover and reveal the opening 13O. For example, the hood panel 13H may be removed from the body 12 to expose the opening 13O.

The storage compartment 70A and hood panel 13H may be a single integrally formed component in some implementations; however, this need not always be the case. In some implementations, the storage compartment 70A shown in FIGS. 10A to 10D may be a component that is separate from the hood panel 13H. For example, the storage compartment 70A may be an insert or tray that is mounted at least partially within the inner cavity 17C of the snowmobile 10. The hood panel 13H may be mounted to the snowmobile 10 separately to selectively cover and reveal the opening 13O of the storage compartment 70A.

It should be noted that a storage compartment 70 may also or instead be selectively closable by a side panel 13S. For example, the side panel 13S may be moveably mounted to the body 12 of the snowmobile 10 and displaceable relative to the body 12 (e.g., pivotable or removable) to cover and reveal an opening 13O of the storage compartment 70.

Figure 11:
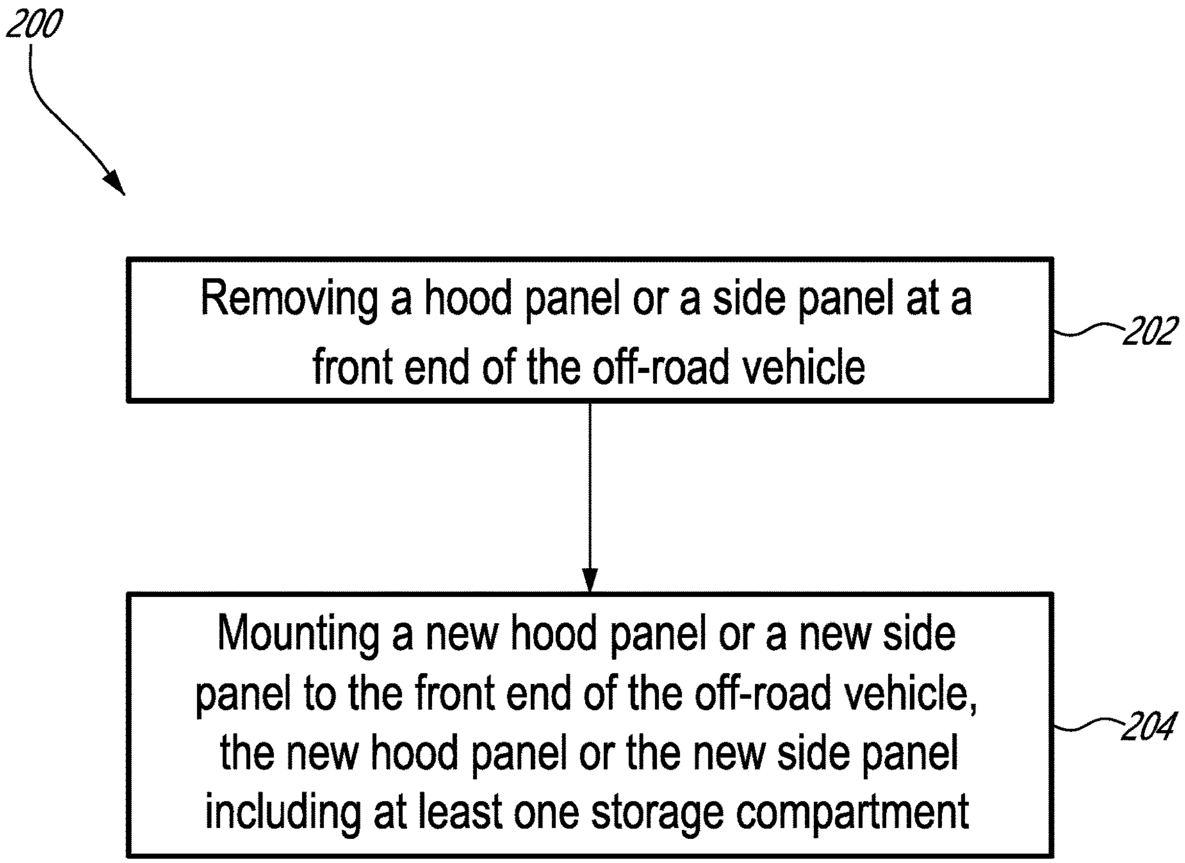
FIG. 11 is a flow diagram illustrating a method disclosed herein.

Referring to FIG. 11, there is disclosed a method 200 of providing storage to the off-road vehicle 9. At 202, the method 200 includes removing one or both of the hood panel 13H or the side panel 13S at the front end 12F of the off-road vehicle 9. At 204, the method 200 includes mounting a new or replacement hood panel, or a new or replacement side panel to the front end 12F of the off-road vehicle 9. In some implementations, step 202 includes removing or loosening one or more fasteners connecting the hood panel 13H or the side panel 13S to the off-road vehicle 9, and connecting the new or replacement hood panel, or the new or replacement side panel to the off-road vehicle 9 using the fasteners. The new body panel includes one or more storage compartment (s) 70. The method 200 allows for replacing or upgrading an existing hood or side panel 13H, 13S on the off-road vehicle 9 for another hood or side panel 13H, 13S that has storage capacity, without having to make any other changes to the off-road vehicle 9. The new or replacement hood or side panel 13H, 13S may be an accessory that is provide as an upgrade to an existing off-road vehicle 9. The method 200 may be used to replace only one of the existing hood or side panels 13H, 13S, so that the new body panel 13 provides storage capacity.

Although the embodiments outlined above are primarily described in relation to the snowmobile 10, the storage compartment(s) 70 may also be implemented in other implementations of the off-road vehicle 9.

Figure 12:
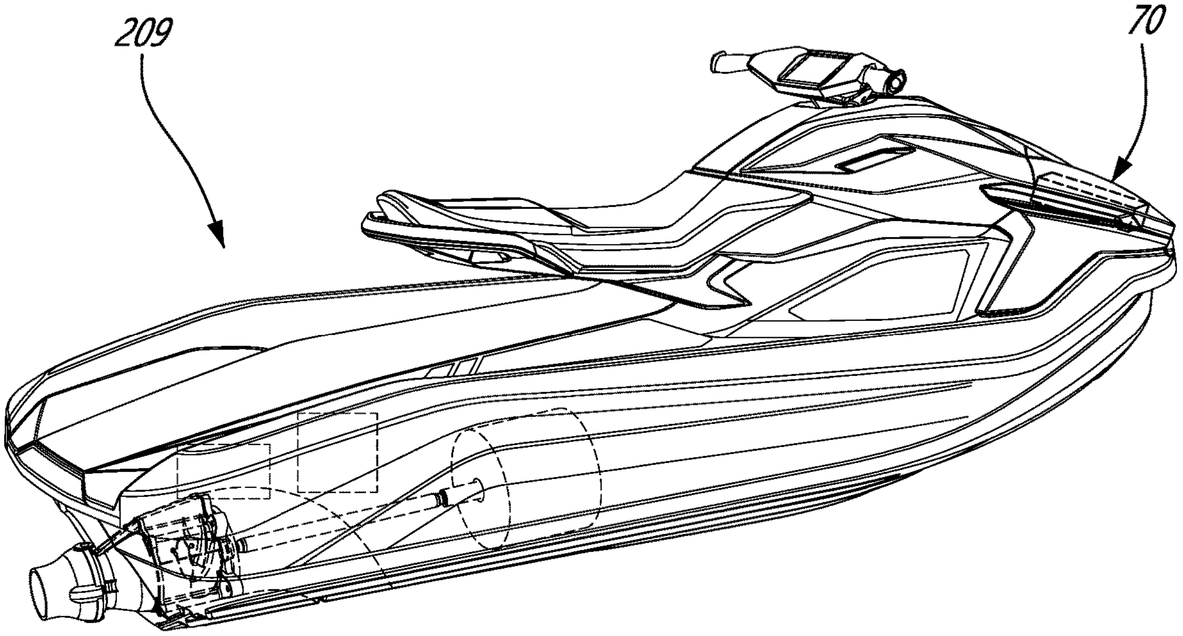
FIG. 12 is a perspective view of an off-road vehicle having another configuration of a storage compartment.

Referring to FIG. 12, the off-road vehicle 9 is a watercraft, and more particularly, a personal watercraft 209. The personal watercraft 209 includes one or more storage compartment(s) 70 as disclosed herein, which are located at a front end of the personal watercraft 209.

Figure 13A:
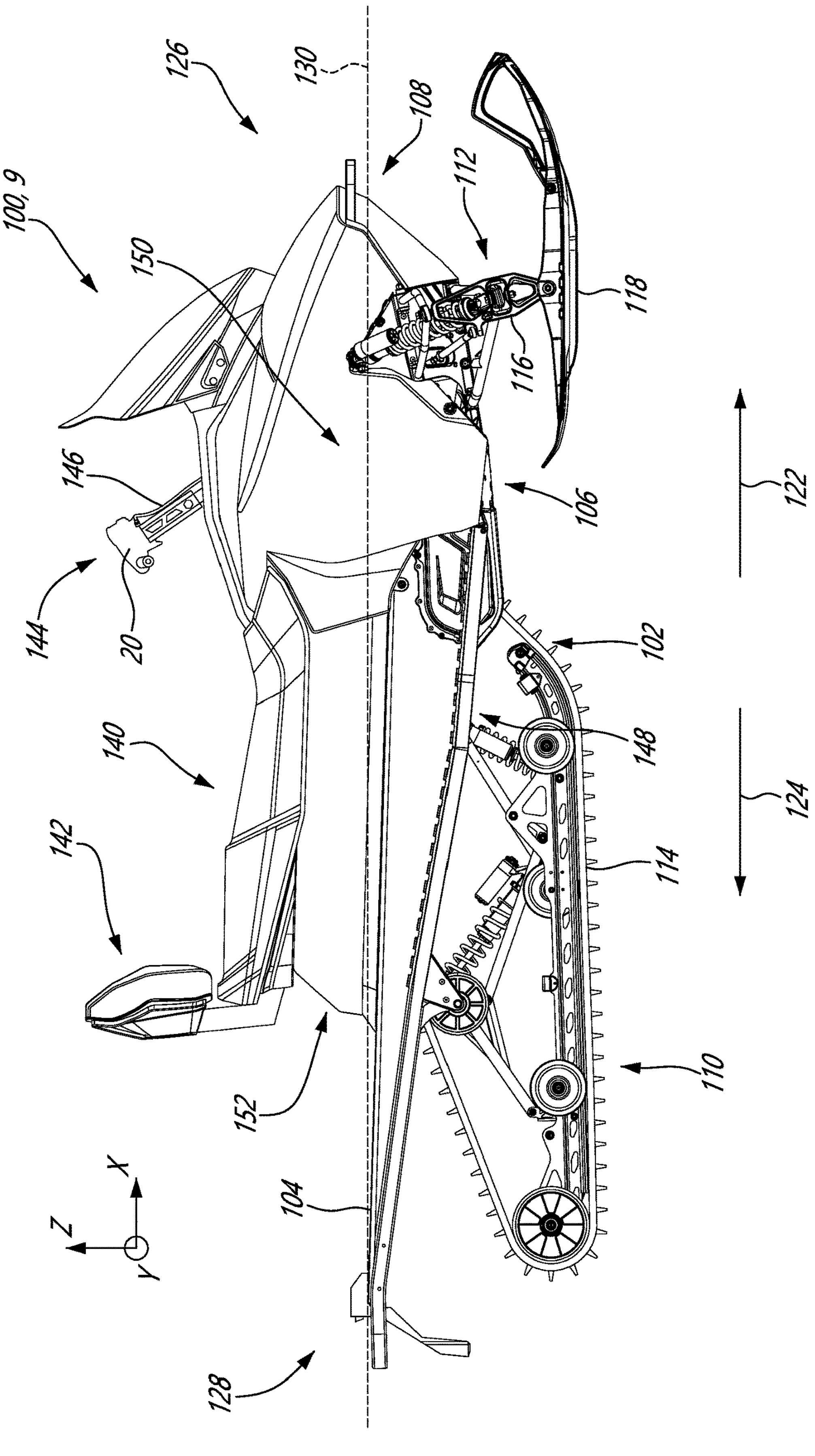
FIG. 13A illustrates a side plan view of another snowmobile.
Figure 13B:
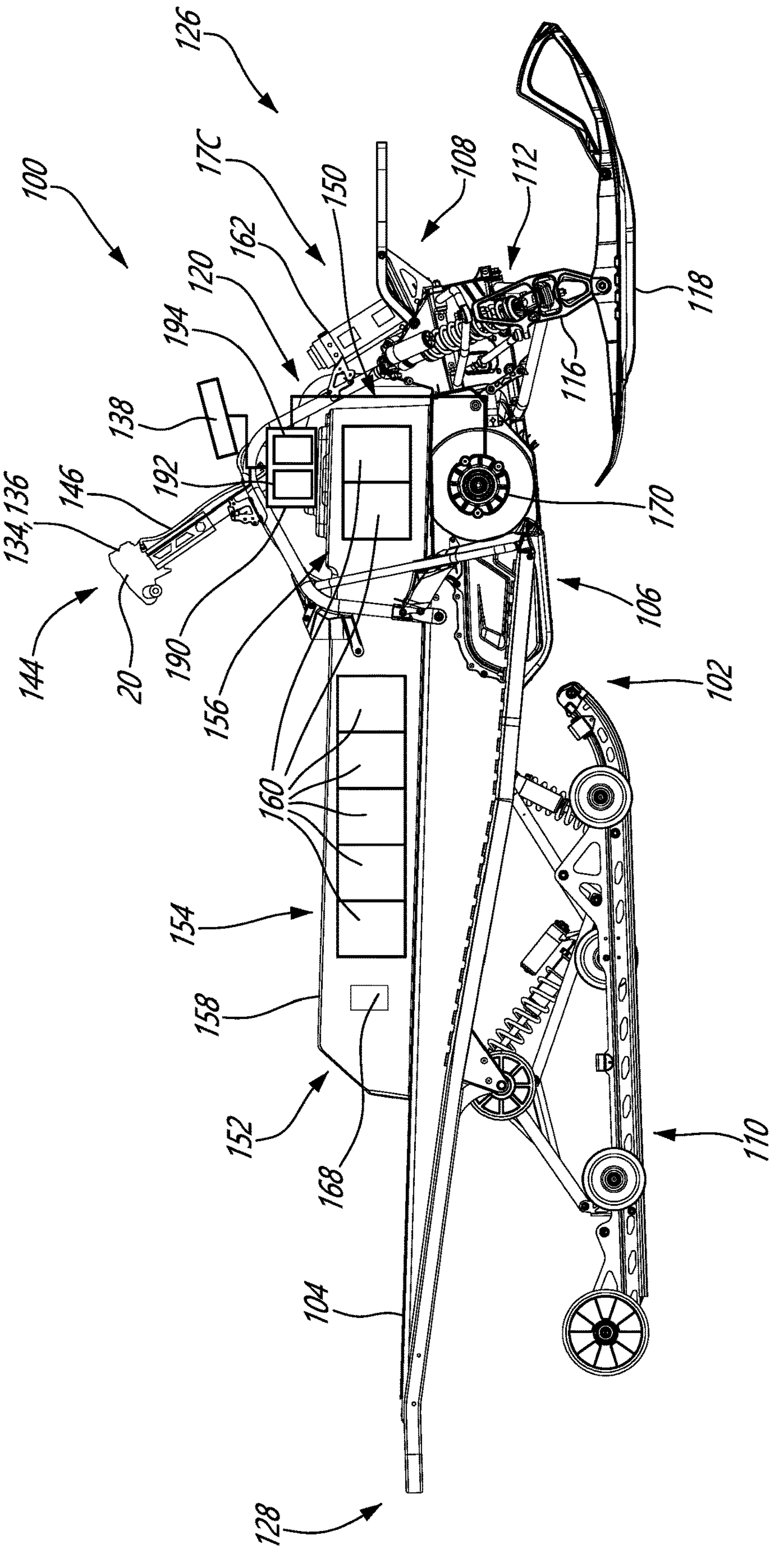
FIG. 13B illustrates another side plan view of the snowmobile of FIG. 13A with several body panels and other components removed so that the interior of the snowmobile may be viewed.

Referring to FIGS. 13A and 13B, the off-road vehicle 9 is another example snowmobile 100. The snowmobile 100 may include one or more storage compartment(s) 70 as disclosed herein, which may be located at a front end of the snowmobile 100. FIG. 13A illustrates a side plan view of the snowmobile 100, according to an embodiment, and FIG. 13B illustrates another side plan view of the snowmobile 100 with several body panels and other components removed so that the interior of the snowmobile 100 may be viewed. The snowmobile 100 includes a frame 102, which may also be referred to as a "chassis" or "body", that provides a load bearing framework for the snowmobile 100. In the illustrated embodiment, the frame 102 includes a longitudinal tunnel 104, a mid-bay 106 (or "bulkhead") coupled forward of the tunnel 104, and a front sub-frame 108 (or "front brace") coupled forward of the mid-bay 106. In some implementations, the mid-bay 106 may form part of the front sub-frame 108.

The snowmobile 100 also includes a rear suspension assembly 110 and a front suspension assembly 112 to provide shock absorption and improve ride quality. The rear suspension assembly 110 may be coupled to the underside of the tunnel 104 to facilitate the transfer of loads between the rear suspension assembly 110 and the tunnel 104. The rear suspension assembly 110 supports a drive track 114 having the form of an endless belt for engaging the ground (e.g., snow) and propelling the snowmobile 100. The rear suspension assembly may include, inter alia, one or more rails and/or idler wheels for engaging with the drive track 114, and one or more control arms and damping elements (e.g., elastic elements such as coil and/or torsion springs forming a shock absorber) connecting the rails to the tunnel 104. The front suspension assembly 112 includes two suspension legs 116 coupled to the front sub-frame 108 and to respective ground engaging front skis 118 (only one suspension leg 116 and ski 118 are visible in FIGS. 13A and 13B). Each of the suspension legs 116 may include two A-frame arms connected to the front sub-frame 108, a damping element (e.g., an elastic element) connected to the front sub-frame 108, and a spindle connecting the A-frame arms and the damping element to a respective one of the skis 118. The suspension legs 116 transfer loads between the skis 118 and the front sub-frame 108. In the illustrated embodiment, the frame 102 also includes an over structure 120 (shown in FIG. 13B), that may include multiple members (e.g., tubular members) interconnecting the tunnel 104, the mid-bay 106 and/or the front sub-frame 108 to provide additional rigidity to the frame 102. However, as discussed elsewhere herein, the over structure 120 may be omitted in some embodiments.

The snowmobile 100 may move along a forward direction of travel 122 and a rearward direction of travel 124 (shown in FIG. 13A). The forward direction of travel 122 is the direction along which the snowmobile 100 travels in most instances when displacing. The rearward direction of travel 124 is the direction along which the snowmobile 100 displaces only occasionally, such as when it is reversing. The snowmobile 100 includes a front end 126 and a rear end 128 defined with respect to the forward direction of travel 122 and the rearward direction of travel 124. For example, the front end 126 is positioned ahead of the rear end 128 relative to the forward direction of travel 122. The snowmobile 100 defines a longitudinal center axis 130 that extends between the front end 126 and the rear end 128. Two opposing lateral sides of the snowmobile 100 are defined parallel to the center axis 130. The positional descriptors "front", "rear" and terms related thereto are used in the present disclosure to describe the relative position of components of the snowmobile 100. For example, if a first component of the snowmobile 100 is described herein as being in front of, or forward of, a second component, then the first component is closer to the front end 126 than the second component. Similarly, if a first component of the snowmobile 100 is described herein as being behind, or rearward of, a second component, then the first component is closer to the rear end 128 than the second component. The snowmobile 100 also includes a three-axes frame of reference that is displaceable with the snowmobile 100, where the Z-axis is parallel to the vertical direction, the X-axis is parallel to the center axis 130, and the Y-axis is parallel to the lateral direction.

The snowmobile 100 is configured to carry one or more riders, including a driver (sometimes referred to as an "operator") and optionally one or more passengers. In the illustrated example, the snowmobile 100 includes a straddle seat 140 to support the riders. Optionally, the straddle seat 140 includes a backrest 142. The operator of the snowmobile 100 may steer the snowmobile 100 using a steering mechanism 144 (e.g., handle 20), which are operatively connected to the skis 118 via a steering shaft 146 to control the direction of the skis 118. The tunnel 104 may also include or be coupled to footrests 148 (also referred to as "running boards"), namely left and right footrests each sized for receiving a foot of one or more riders sitting on the straddle seat 140.

Referring to FIG. 13B, the snowmobile 100 is electrically propelled by an electric powertrain 150. The powertrain 150 includes an electric battery 152 (also referred to as a "battery pack") and an electric motor 170. The battery 152 is electrically connected to the motor 170 to provide electric power to the motor 170. The motor 170, in turn, is drivingly coupled to the drive track 114 to propel the snowmobile 100 across the ground. In other embodiments, the snowmobile 100 may also or instead be propelled by a powertrain including an internal combustion engine. For example, the motor 170 may also or instead be an internal combustion engine.

The battery 152 may include a battery enclosure 158 that houses one or more battery modules 160. The battery enclosure 158 may support the battery modules 160 and protect the battery modules 160 from external impacts, water and/or other hazards or debris. Each battery module 160 may contain one or more battery cells, such as pouch cells, cylindrical cells and/or prismatic cells, for example. In some implementations, the battery cells are rechargeable lithium-ion battery cells. The battery 152 may also include other components to help facilitate and/or improve the operation of the battery 152, including temperature sensors to monitor the temperature of the battery cells, voltage sensors to measure the voltage of one or more battery cells, current sensors to implement column counting to infer the state of charge (SOC) of the battery 152, and/or thermal channels that circulate a thermal fluid to control the temperature of the battery cells. In some implementations, the battery 152 may also include a heater 168 to heat the thermal fluid and warm the battery 152. In some implementations, the battery 152 may output electric power at a voltage of between 300 and 800 volts, for example. The snowmobile 100 may also include a charger 162 to convert AC to DC current from an external power source to charge the battery 152. The charger 162 may include, or be connected to, a charging port positioned forward of the straddle seat 140 to connect to a charging cable from an external power source. In some implementations, the charging port is covered by one or more protective flaps (e.g., made of plastic and/or rubber) to protect the charging port from water, snow and other debris.

In some implementations, the battery 152 may be generally divided into a tunnel battery portion 154 and a mid-bay battery portion 156. The tunnel battery portion 154 may be positioned above and coupled to the tunnel 104. As illustrated, the straddle seat 140 is positioned above the tunnel battery portion 154 and, optionally, the straddle seat 140 may be supported by the battery enclosure 158 and/or internal structures within the battery 152. The mid-bay battery portion 156 extends into the mid-bay 106 and may be coupled to the mid-bay 106 and/or to the front sub-frame 108. The tunnel battery portion 154 and the mid-bay battery portion 156 may share a single battery enclosure 158, or alternatively separate battery enclosures. In the illustrated example, the tunnel battery portion 154 and the mid-bay battery portion 156 each include multiple battery modules 160 that are arranged in a row and/or stacked within the battery enclosure 158.

Referring again to FIG. 13B, one or more controllers 190 (referred to hereinafter in the singular) and an instrument panel 134 are part of a control system for controlling operation of the snowmobile 100. The instrument panel 134 allows an operator of the snowmobile 100 to generate user inputs and/or instructions for the snowmobile 100. The controller 190 is connected to the instrument panel 134 to receive the instructions therefrom and perform operations to implement those instructions. In the illustrated embodiment, the instrument panel 134 is provided on the steering mechanism 144 and the controller 190 is disposed within the interior of the snowmobile 100, but this need not always be the case.

The instrument panel 134 includes an accelerator 136 (also referred to as a "throttle") to allow an operator to control the power generated by the powertrain 150. For example, the accelerator 136 may include a lever to allow the operator to selectively generate an accelerator signal. The controller 190 is operatively connected to the accelerator 136 and to the motor 170 to receive the accelerator signal and produce a corresponding output from the motor 170. In some implementations, the accelerator signal is mapped to a torque of the motor 170. The mapping of the accelerator signal to an output from the motor 170 may be based on a performance mode of the snowmobile 100 (e.g., whether the snowmobile 100 is in a power-saving mode, a normal mode or a high-performance mode). In some examples, the mapping of the accelerator signal to an output from the motor 170 may be based on current operating conditions of the powertrain 150 (e.g., temperature of the battery 152 and/or motor 170, state of charge of the battery 152, etc.). In still other examples, the mapping of the accelerator signal to an output from the motor 170 may be user configurable, such that a user may customize an accelerator position to motor output mapping.

In addition to the accelerator 136, the instrument panel 134 may include other user input devices (e.g., levers, buttons and/or switches) to control various other functionality of the snowmobile 100. These user input devices may be connected to the controller 190, which executes the instructions received from the user input devices. Non-limiting examples of such user input devices include a brake lever to implement mechanical and/or electrical braking of the snowmobile 100, a reverse option to propel the snowmobile 100 in the rearward direction of travel 124, a device to switch the snowmobile 100 between different vehicle states (e.g., "off", "neutral" and "drive" states), a device to switch the snowmobile 100 between different performance modes, a device to switch between regenerative braking modes (e.g. "off", "low" and "high" modes) and a device to activate heating of handgrips of the steering mechanism. The snowmobile 100 also includes a display screen 138 connected to the controller 190. The display screen 138 may be provided forward of the steering mechanism 144, or in any other suitable location depending on the design of the snowmobile 100. The display screen 138 displays information pertaining to the snowmobile 100 to an operator. Non-limiting examples of such information include the current state of the snowmobile 100, the current performance mode of the snowmobile 100, the speed of the snowmobile 100, the state of charge (SOC) of the battery 152, the angular speed of the motor 170, and the power output from the motor 170. The display screen 138 may include a liquid crystal display (LCD) screen, thin-film-transistor (TFT) LCD screen, light-emitting diode (LED) or other suitable display device. In some embodiments, display screen 138 may be touch-sensitive to facilitate operator inputs.

The controller 190 may also control additional functionality of the snowmobile 100. For example, the controller 190 may control a battery management system (BMS) to monitor the SOC of the battery 152 and manage charging and discharging of the battery 152. In another example, the controller 190 may control a thermal management system to manage a temperature of the battery 152, the motor 170 and/or the charger 162 using a thermal fluid. Temperature sensors in the battery 152 and/or the motor 170 may be connected to the controller 190 to monitor the temperature of these components.

The controller 190 includes one or more data processors 192 (referred hereinafter as "processor 192") and non-transitory machine-readable memory 194. The memory 194 may store machine-readable instructions which, when executed by the processor 192, cause the processor 192 to perform any computer-implemented method or process described herein. The processor 192 may include, for example, any type of general-purpose microprocessor or microcontroller, a digital signal processing (DSP) processor, an integrated circuit, an application-specific integrated circuit (ASIC), a field programmable gate array (FPGA), a reconfigurable processor, other suitably programmed or programmable logic circuits, or any combination thereof. The memory 194 may include any suitable machine-readable storage medium such as, for example, an electronic, magnetic, optical, electromagnetic, infrared, or semiconductor system, apparatus, or device, or any suitable combination thereof. The memory 194 may be located internally and/or externally to the controller 190.

Although the controller 190 is shown as a single component in FIG. 13B, this is only an example. In some implementations, the controller 190 may include multiple controllers distributed at various locations in the snowmobile 100. For example, the controller 190 may include a vehicle control unit (also referred to as a "body controller") that is responsible for interpreting the inputs from various other controllers in the snowmobile 100. Non-limiting examples of these other controllers include a motor controller that is part of the power electronics module 174 and a battery management controller that is part of the battery 152. Optionally, separate battery management controllers may be implemented in the each of the battery modules 160 to form a distributed battery management system.

As shown in FIG. 13B, the snowmobile 100 includes an inner cavity 17C generally within the front-subframe 108. Advantageously, this inner cavity 17C may be leveraged to implement the storage compartment(s) 70 described elsewhere herein. The inner cavity 17C may be provided, at least in part, due to the compact configuration of the powertrain 150. For example, by positioning the motor 170 within the mid-bay, and the battery 152 above the tunnel 104 and the mid-bay 106, free space is maintained in the front-subframe 108 for the storage compartment(s) 70. Other components such as the controller 190 are also advantageously positioned outside of the front-subframe 108 (e.g., above the battery 152 in the illustrated example). In some embodiments, the charger 162 may be moved to a different location of the snowmobile 100, such as within the battery enclosure 158, to create additional storage space within the inner cavity 17C.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A snowmobile comprising:

a body extending along a longitudinal axis between a front end and a rear end, the body including at least one hood panel at the front end of the body; and at least one storage compartment defining a storage volume to store items and an opening to access the storage volume, the opening selectively closable by the at least one hood panel, wherein:

the at least one hood panel at least partially delimits an inner cavity of the body; and the at least one storage compartment comprises a side wall extending into the inner cavity from the opening, the side wall at least partially delimiting the opening.

2. The snowmobile of claim 1, wherein the at least one hood panel includes a door moveably mounted to the body and displaceable relative to the body to cover and reveal the opening.

3. The snowmobile of claim 2, wherein the door is pivotably mounted to the body.

4. The snowmobile of claim 1, wherein the at least one hood panel is moveably mounted to the body and displaceable relative to a remainder of the body to cover and reveal the opening.

5. The snowmobile of claim 4, wherein the at least one hood panel is pivotably mounted to the body.

6. The snowmobile of claim 5, wherein the at least one hood panel is pivotable from a closed position in a forward direction to an open position.

7. The snowmobile of claim 1, wherein the at least one storage compartment includes a bottom wall connected to the side wall, the bottom wall defining a bottom surface of the at least one storage compartment.

8. The snowmobile of claim 1, comprising an electric motor for propelling the snowmobile.

9. The snowmobile of claim 8, wherein the electric motor is absent from the inner cavity.

10. The snowmobile of claim 9, wherein the electric motor is disposed within a mid-bay of the snowmobile.

11. The snowmobile of claim 1, wherein the body includes a rear tunnel and a front sub-frame disposed closer to the front end than the rear tunnel, the front sub-frame at least partially delimiting the inner cavity.

12. The snowmobile of claim 1, wherein the at least one storage compartment is releasably installed in the inner cavity.

13. The snowmobile of claim 1, where the storage compartment is integral with the at least one hood panel.

14. The snowmobile of claim 1, where the storage compartment is separate from the at least one hood panel.

15. The snowmobile of claim 1, comprising a handle for steering the snowmobile, the at least one storage compartment being forward of the handle along the longitudinal axis.

16. The snowmobile of claim 15, wherein the opening is forward of the handle.

17. The snowmobile of claim 15, wherein the at least one hood panel is forward of the handle.

18. A snowmobile comprising:

a body extending along a longitudinal axis between a front end and a rear end, the body including at least one side panel at the front end of the body; and at least one storage compartment defining a storage volume to store items and an opening to access to the storage volume, the opening selectively closable by the at least one side panel.

19. A snowmobile comprising:

a body extending along a longitudinal axis between a front end and a rear end, the body including at least one hood panel and at least one side panel, the at least one hood panel and the at least one side panel disposed at the front end and at least partially delimiting an inner cavity of the body; and at least one storage compartment at the front end of the body and occupying at least part of the inner cavity, the at least one storage compartment accessible via an opening in one or both of the at least one hood panel and the at least one side panel.

* * * * *